(12) United States Patent
Goel et al.

(10) Patent No.: US 11,038,993 B2
(45) Date of Patent: Jun. 15, 2021

(54) FLEXIBLE PROCESSING OF NETWORK PACKETS

(71) Applicant: Fungible, Inc., Santa Clara, CA (US)

(72) Inventors: Deepak Goel, San Jose, CA (US); Jean-Marc Frailong, Los Altos Hills, CA (US); Srihari Raju Vegesna, San Jose, CA (US); Stimit Kishor Oak, San Jose, CA (US); Rohit Sunkam Ramanujam, Sunnyvale, CA (US); John David Huber, San Diego, CA (US); Hariharan Lakshminarayanan Thantry, Fremont, CA (US); Vikas Minglani, Cupertino, CA (US); Saurin Patel, San Jose, CA (US); Sureshkumar Nedunchezhian, San Jose, CA (US)

(73) Assignee: FUNGIBLE, INC., Santa Clara, CA (US)

( * ) Notice: Subject to any disclaimer, the term of this patent is extended or adjusted under 35 U.S.C. 154(b) by 33 days.

(21) Appl. No.: 16/352,492

(22) Filed: Mar. 13, 2019

(65) Prior Publication Data

US 2019/0289102 A1    Sep. 19, 2019

Related U.S. Application Data

(60) Provisional application No. 62/642,798, filed on Mar. 14, 2018.

(51) Int. Cl.
*H04L 12/24*     (2006.01)
*H04L 12/743*    (2013.01)
(Continued)

(52) U.S. Cl.
CPC .......... *H04L 69/22* (2013.01); *H04L 41/0266* (2013.01); *H04L 45/7453* (2013.01); *H04L 45/7457* (2013.01); *H04L 49/252* (2013.01)

(58) Field of Classification Search
CPC ............. H04L 41/0266; H04L 45/7453; H04L 45/7457; H04L 49/252; H04L 69/22
See application file for complete search history.

(56) References Cited

U.S. PATENT DOCUMENTS

| 5,805,808 | A | 9/1998 | Hasani et al. |
| 6,091,707 | A | 7/2000 | Chandan et al. |

(Continued)

FOREIGN PATENT DOCUMENTS

| WO | 2013019981 A1 | 2/2013 |
| WO | 2013019996 A1 | 2/2013 |

(Continued)

OTHER PUBLICATIONS

International Preliminary Report on Patentability from International Application No. PCT/US2019/022099, dated Mar. 3, 2020, 17 pp.

(Continued)

*Primary Examiner* — Melvin C Marcelo
*Assistant Examiner* — Natali Pascual Peguero
(74) *Attorney, Agent, or Firm* — Shumaker & Sieffert, P.A.

(57) ABSTRACT

Aspects of this disclosure describes techniques for parsing network packets, processing network packets, and modifying network packets before forwarding the modified network packets over a network. The present disclosure describes a system that, in some examples, parses network packets, generates data describing or specifying attributes of the network packet, identifies operations to be performed when processing a network packet, performs the identified operations, generates data describing or specifying how to modify (Continued)

and/or forward the network packet, modifies the network packet, and outputs the modified packet to another device or system, such as a switch.

19 Claims, 21 Drawing Sheets

(51) Int. Cl.
  *H04L 12/947* (2013.01)
  *H04L 29/06* (2006.01)

(56) References Cited

U.S. PATENT DOCUMENTS

| | | |
|---|---|---|
| 7,187,694 B1 | 3/2007 | Liao |
| 7,610,269 B1 | 10/2009 | Gupta et al. |
| 8,472,452 B2 | 6/2013 | Goyal et al. |
| 8,606,959 B2 | 12/2013 | Goyal et al. |
| 8,711,861 B2 | 4/2014 | Goyal et al. |
| 8,719,331 B2 | 5/2014 | Goyal et al. |
| 8,923,306 B2 | 12/2014 | Bouchard et al. |
| 8,934,488 B2 | 1/2015 | Goyal et al. |
| 8,937,952 B2 | 1/2015 | Goyal et al. |
| 8,937,954 B2 | 1/2015 | Goyal et al. |
| 8,954,700 B2 | 2/2015 | Ansari et al. |
| 8,995,449 B2 | 3/2015 | Goyal et al. |
| 9,031,075 B2 | 5/2015 | Goyal et al. |
| 9,130,819 B2 | 9/2015 | Pangborn et al. |
| 9,137,340 B2 | 9/2015 | Goyal et al. |
| 9,191,321 B2 | 11/2015 | Goyal et al. |
| 9,195,939 B1 | 11/2015 | Goyal et al. |
| 9,208,438 B2 | 12/2015 | Goyal et al. |
| 9,225,643 B2 | 12/2015 | Goyal et al. |
| 9,268,855 B2 | 2/2016 | Goyal et al. |
| 9,275,336 B2 | 3/2016 | Goyal et al. |
| 9,319,316 B2 | 4/2016 | Ansari et al. |
| 9,344,366 B2 | 5/2016 | Bouchard et al. |
| 9,391,892 B2 | 7/2016 | Ansari et al. |
| 9,432,284 B2 | 8/2016 | Goyal et al. |
| 9,497,117 B2 | 11/2016 | Goyal et al. |
| 9,525,630 B2 | 12/2016 | Ansari et al. |
| 9,531,647 B1 | 12/2016 | Goyal et al. |
| 9,531,690 B2 | 12/2016 | Ansari et al. |
| 9,531,723 B2 | 12/2016 | Bouchard et al. |
| 9,544,402 B2 | 1/2017 | Worrell et al. |
| 9,595,003 B1 | 3/2017 | Bullis et al. |
| 9,596,222 B2 | 3/2017 | Goyal et al. |
| 9,614,762 B2 | 4/2017 | Goyal et al. |
| 9,647,947 B2 | 5/2017 | Goyal et al. |
| 9,729,527 B2 | 8/2017 | Goyal et al. |
| 9,866,540 B2 | 1/2018 | Bouchard et al. |
| 10,565,112 B2 | 2/2020 | Noureddine et al. |
| 10,659,254 B2 | 5/2020 | Sindhu et al. |
| 2005/0165966 A1* | 7/2005 | Gai ................. H04L 45/7453 709/249 |
| 2006/0010193 A1 | 1/2006 | Sikdar et al. |
| 2009/0300759 A1 | 12/2009 | Wang et al. |
| 2011/0116507 A1 | 5/2011 | Pais et al. |
| 2013/0282766 A1 | 10/2013 | Goyal et al. |
| 2014/0098824 A1 | 4/2014 | Graham |
| 2014/0122791 A1 | 5/2014 | Fingerhut et al. |
| 2014/0214159 A1 | 7/2014 | Vidlund et al. |
| 2014/0369363 A1 | 12/2014 | Hutchison et al. |
| 2015/0106677 A1 | 4/2015 | Greenfield et al. |
| 2016/0191306 A1 | 6/2016 | Gasparakis et al. |
| 2016/0283391 A1* | 9/2016 | Nilsson ............... G06F 12/0893 |
| 2017/0063690 A1* | 3/2017 | Bosshart ................. H04L 69/22 |
| 2018/0293168 A1 | 10/2018 | Noureddine et al. |
| 2019/0012278 A1 | 1/2019 | Sindhu et al. |
| 2019/0013965 A1 | 1/2019 | Sindhu et al. |
| 2019/0104206 A1 | 4/2019 | Goel et al. |
| 2019/0213151 A1 | 7/2019 | Inoue et al. |
| 2019/0289102 A1 | 9/2019 | Goel et al. |
| 2019/0379770 A1 | 12/2019 | Thantry et al. |
| 2020/0120191 A1 | 4/2020 | Thantry et al. |
| 2020/0183841 A1 | 6/2020 | Noureddine et al. |

FOREIGN PATENT DOCUMENTS

| | | |
|---|---|---|
| WO | 2013020001 A1 | 2/2013 |
| WO | 2013020002 A1 | 2/2013 |
| WO | 2013020003 A1 | 2/2013 |
| WO | 2018/020645 A1 | 2/2018 |

OTHER PUBLICATIONS

Response to Written Opinion dated May 29, 2019, from international application No. PCT/US2019/022099, filed Jan. 14, 2020, 13 pp.

U.S. Appl. No. 16/877,050, filed May 15, 2020, naming inventors Sindhu et al.

U.S. Appl. No. 16/808,026, filed Mar. 3, 2020, naming inventors Goel et al.

Alicherry et al., "High Speed Pattern Matching for Network IDS/IPS," Proceedings of IEEE International Conference on Netwok Protocols, Nov. 2006, pp. 187-196.

Bosshart et al., "Forwarding Metamorphosis: Fast Programmable Match-Action Processing in Hardware for SDN," Proceedings of the ACM SIGCOMM 2013 conference on SIGCOMM, Aug. 12-16, 2013, 12 pp.

Gibb et al., "Design Principles for Packet Parsers," Architectures for Networking and Communications Systems, IEEE, Oct. 21-22, 2013, 12 pp.

International Search Report and Written Opinion of International Application No. PCT/US2019/022099, dated May 29, 2019, 16 pp.

Kozanitis et al., "Leaping Multiple Headers in a Single Bound: Wire-Speed Parsing Using the Kangaroo System," INFOCOM'10 Proceedings of the 29th conference on Information communications, Mar. 14, 2010, 9 pp.

Tsai et al., "A Flexible Wildcard-Pattern Matching Accelerator via Simultaneous Discrete Finite Automata," IEEE Transactions on Very Large Scale Integration (VLSI) Systems, vol. 25, No. 12, Dec. 2017, pp. 3302-3316.

U.S. Appl. No. 16/160,609, filed Oct. 15, 2018 naming inventors Thantry et al.

U.S. Appl. No. 16/434,983, filed Jun. 7, 2019 naming inventors Thantry et al.

* cited by examiner

| Field Name | Size | Explanation |
|---|---|---|
| Template | 2B | Software can create unique packet templates describing the structure of the Field Vector in the PRV. The initial value is derived from a lookup table indexed by stream number. Software can change the template value during the parsing process based on the headers encountered. |
| Soft Flags | 4B | Software can use this area to set and to reset some of the flags. Unlike the GPRs that are byte-indexed, the flags area is bit-indexed region. The parser will support actions to perform bit-level operations on a single flag addressed by a Sb flag number.<br>Example use cases:<br>• Software can use this to create "valid" for different fields in the Field Vector.<br>• Software can set one of the flags to indicate if the packet is fragmented.<br>• Software can set a flag to indicate if the packet has an option header.<br>Software can set a flag to indicate an unsupported ethertype or other error cases that terminate parsing. |
| Header offsets | 8B | Software can generate byte offsets of different headers in the packet and save it in this region of the PRV. The offsets can be used while rewriting the packet header and also for passing hints to the VP. Each byte in this region is uniquely addressable and can store a header offset. All bytes are initialized to 8'hff to indicate an invalid entry.<br>Byte0: Start byte of the VLAN stack<br>Byte1: Outer Layer 3 offset<br>Byte2: Outer Layer 4 offset<br>Byte3: Inner Layer 2 offset<br>... |
| Field Vector (64B) | | |
| Stream Number | 1B | Ingress stream number. The stream number is 6b. 2 MSB bits are reserved for future expansion. |
| Hardware error trap code | 1B | Error related to the parsing machinery. If any hardware error is detected, a code indicating the first error encountered will be stored in this field. The forwarding pipeline may decide to send the packet to CPU or drop the packet.<br>Bit [7] is valid.<br>Errors Type (bits [6:0]):<br>0: Packet too short<br>1: Outer IPV4 checksum error<br>2: Inner IPV4 checksum error<br>3: No TCAM rule match<br>4: Parser timeout<br>5: PRV out of range/rollover<br>6: Packet Pointer out of range/rollover<br>7: Header buffer overflow<br>8: Move header bytes out of range<br>9: Move GP bytes out of range |
| Field Vector | 94B | Software can generate different structure types and create the field vector.<br>One template example of the field vector is following:<br>{Ethernet_DA[6B], Ethernet_SA[6B], VLAN0 [2B], VLAN1 [2B], last_ethertype, IPv6_DIP [16B], IPv6_SIP [16B], TOS [1B], TTL [1B], Layer4 Protocol [1B], Layer4 Source Port [2B], Layer4 Destination Port [2B], TCP flags [1B], Padding[41B]} |

FIG. 5B

| Metadata Structure | Template (16 bits) | Flags (18) | | HBO4 (8*8) |
|---|---|---|---|---|
| PRV Template | | Flags (18) | | |
| | Layer 1 type: 2 bits [1:0] | | 0 | None |
| | | | 1 | FAE_HDR |
| | | | 2 | C2T_HDR |
| | | | 3 | P2x_HDR |
| | | | | |
| | Layer 2 type: 1 bit [2:2] | | 0 | None |
| | | | 1 | Ethernet |
| | | | | |
| | VLAN type: 1 bit [3:3] | | 0 | None |
| | | | 1 | one |
| | | | | |
| | Layer 3 type: 2 bits [5:4] | | 0 | IPv4 |
| | | | 1 | IPv6 |
| | | | 2 | None |
| | | | 3 | Reserved |
| | Layer 4 type: 2 bits [7:6] | | 0 | None |
| | | | 1 | TCP |
| | | | 2 | UDP |
| | | | | |
| | Layer 5 type: 2 bits [9:8] | | 0 | None |
| | | | 1 | FCP |
| | | | 2 | PTP |
| | | | 3 | Reserved |
| | | | | |
| | Reserved: 10 bits | | | |
| | | | | |
| PRV_Flags | | 0 | Flag 0 | |
| | | 1 | LFA tag present | HWR |
| | | 2 | FSF Frame | HWR |
| | | 3 | Potential FCP | HWR |
| | | 4 | vlan_present | HWR |
| | | 5 | gph present | HWR |
| | | 6 | L3_MCAST | |
| | | 7 | L3_MCAST | |
| | | 8 | Tiny Fragment | |
| | | 9 | Don't Fragment | |
| | | 10 | Fragmented Packet | |
| | | 11 | First Fragment | |
| | | 12 | IP_OPTION_PRESENT | |
| | | 13 | IP_TTL_1_OR_0 | |
| | | 14 | ECN enable | |
| | | 15 | fae_mode | |
| | | 16 | is_overlay | |
| | | 17 | Reserved | |

FIG. 5C

| | | | | |
|---|---|---|---|---|
| PRV.HBOA | | 0 | Layer 2 Byte Offset | |
| | | 1 | VLAN Tag Offset | |
| | | 2 | Layer 3 offset | |
| | | 3 | Layer 3 end offset | |
| | | 4 | Layer 4 offset | |
| | | 5 | Layer 5 (FCP) Offset/PTP header offset | |
| | | 6-7 | Reserved | |
| PRV.Field Vector | | | | |
| Start Byte Position | Size | | | |
| 0 | 1 | | PSW Stream | HW |
| 1 | 1 | | Parser Error | HW |
| 2 | 4 | | Timestamp | HW |
| 6 | 1 | | Forwarding Stream | SW/HWR |
| 7 | 2 | | Ingress Logical Port | SW/HWR |
| 9 | 2 | | Layer 4 source port | SW/HWR |
| 11 | 2 | | Layer 4 destination port | SW/HWR |
| 13 | 2 | | Layer 3 payload length | SW/HWR |
| 15 | 2 | | Visited F1 Vector | SW/HWR |
| 15 | 1 | | FSF_GPH_INDEX | SW/HWR |
| 16 | 1 | | Reserved | SW/HWR |
| 17 | 4 | | Stage Bypass Vector | SW/HWR |
| 21 | 2 | | Nexthop Index | SW |
| 23 | 1 | | Traffic Class | SW |
| 24 | 6 | | Ethernet SMAC | SW |
| 30 | 6 | | Ethernet DMAC | |
| 36 | 2 | | VLAN_TAG0+.1p bits | |
| 38 | 2 | | Ethertype | |
| 40 | 1 | | IP Proto | |
| 41 | 1 | | IP DSCP + ECN | |
| 42 | 1 | | Fragment Flags + Offset | |
| 41 | 1 | | (IPv4 ver[3:0],IPv4 TOS[7:4]) | |
| 42 | 1 | | (IPv4 TOS[3:0],IPv4 Flow Label[3:0]) | |
| 43 | 1 | | Reserved/Used for IPv6 | |
| 44 | 1 | | Layer 4 flags | |
| 45 | 4 | | IPv4_SIP | |
| 49 | 4 | | IPv4_DIP | |
| 53 | 2 | | IP Identification | |
| 55 | 16 | | GPH | |
| 71 | 25 | | Reserved (25 bytes) | |
| 45 | 16 | | IPv6_SIP | |
| 61 | 16 | | IPv6_DIP | |
| 77 | 19 | | Reserved (19 bytes) | |

FIG. 5C (continued)

| PRV Structure | Template [15 bits] | Flags [1:6] | HWA [9:2] |
|---|---|---|---|
| Metadata Structure | | Flags [1:9] | |
| PRV Template | | | |
| | Layer 1 type: 2 bits [1:0] | | 0 T2N Header |
| | | | 1 T2C Header |
| | | | 2 T2N+FCP |
| | | | 3 P2N Header |
| | Layer 2 type: 1 bit [2:2] | | 0 None |
| | | | 1 Ethernet |
| | VLAN type : 1bit [3:3] | | 0 None |
| | | | 1 one |
| | Underlay Layer 3 type: 2 bits [5:4] | | 0 IPv4 |
| | | | 1 IPv6 |
| | | | 2-3 Reserved |
| | Underlay Layer 4 type: 2 bits [7:6] | | 0 None/Reserved |
| | | | 1 TCP |
| | | | 2 UDP |
| | Overlay Type: 2 bits [9:8] | | 0 VXLAN |
| | | | 1 MPLS |
| | | | 2-3 Reserved |
| | Overlay Layer 3 type [11:10] | | 0 IPv4 |
| | | | 1 IPv6 |
| | | | 2-3 Reserved |
| | Overlay Layer4 type [13:12] | | 0 None/Reserved |
| | | | 1 TCP |
| | | | 2 UDP |
| | Reserved bits [15:14] | | |
| PRV Flags | | 0 Flag 0 | |
| | | 1 fcp_dat_hdr | HWR |
| | | 2 fcp_req_hdr | HWR |
| | | 3 fcp_gnt_hdr | HWR |
| | | 4 fcp_dummy | HWR |
| | | 5 fcp_gph_valid | HWR |
| | | 6 fcp_security_header | HWR |
| | | 7 fcp_control | HWR |
| | | 8 LRO Hint | SW |
| | | 9 Underlay IP options | SW |

FIG. 5D

| | | | | |
|---|---|---|---|---|
| | | 10 FCP IPv4 ECN set | SW | |
| | | 11 Overlay IP options | SW | |
| | | 12 is_vnid_valid | | |
| | | 13 Underlay L2_MCAST | | |
| | | 14 Underlay L3_MCAST | | |
| | | 15 Underlay Tiny Fragment | | |
| | | 16 Underlay Don't Fragment | | |
| | | 17 Underlay Fragmented Packet | | |
| | | 18 Underlay First Fragment | | |
| | | 19 Underlay IP_TTL_1_OR_0 | | |
| | | 20 Overlay L3_MCAST | | |
| | | 21 Overlay L3_MCAST | | |
| | | 22 Overlay tiny fragment | | |
| | | 23 Overlay is First Fragment | | |
| | | 24 Overlay Fragmented Packet | | |
| | | 25 Overlay ttl 1 or 0 | | |
| | | 26 is_overlay_packet | | |
| | | 27 fcp_trace | | |
| | | 28 fcp_control | | |
| | | 29 is_bridged | | |
| | | 30 Reserved | | |
| | | 31 Reserved | | |
| | | 32 Reserved | | |
| PRV.HBOA | | 0 T2N or T2C header offset | | |
| | | 1 Underlay Layer 2 header offset | | |
| | | 2 Underlay layer 3 header offset | | |
| | | 3 Underlay layer 4 header offset | | |
| | | 4 Overlay header offset | | |

FIG. 5D (continued)

| PRV Field Vector Start Byte Position | Size | | |
|---|---|---|---|
| 0 | 1 | EPG Stream | HW |
| 1 | 1 | Parser Error | HW |
| 2 | 4 | Timestamp | HW |
| 6 | 2 | Underlay Layer 4 source port | SW+HWR |
| 8 | 2 | Underlay Layer 4 destination port | SW+HWR |
| 10 | 2 | T2x Packet Length | SW+HWR |
| 12 | 1 | TCP Flags | SW+HWR |
| 13 | 2 | orig ingress stream / ingress logical port | |
| 15 | 1 | pcid | |
| 16 | 1 | Underlay Protocol (IPv6 Next Header) | |
| 17 | 4 | Underlay IPv4_SIP | |
| 21 | 4 | Underlay IPv4_DIP | |
| 25 | 2 | IP Identification | |
| 27 | 1 | IP DSCP + ECN | |
| 28 | 2 | Fragment Flags + Offset | |
| 30 | 2 | Reserved | |
| 32 | 16 | Underlay IPv6_SIP | |
| 48 | 16 | Underlay IPv6_DIP | |
| 64 | 3 | Underlay IPv6 TOS | |
| 51 | 3 | Overlay VNID header (or MPLS label) | |
| 54 | 6 | Overlay Ethernet DMAC | |
| 60 | 1 | Overlay Protocol | |
| 61 | 2 | Overlay Layer 4 source port | |
| 63 | 2 | Overlay Layer 4 destination port | |
| 65 | 4 | Overlay IPv4_SIP | |
| 69 | 4 | Overlay IPv4_DIP | |
| 73 | 21 | Reserved | |

FIG. 5D (continued)

| Metadata Flags | | |
|---|---|---|
| 0 | SW | Global Bypass |
| 1 | SW | logical_port.trust_l3_cos |
| 2 | SW | logical_port.trust_l2_cos |
| 3 | | |
| 4 | | |
| 5 | | |
| 6 | | |
| 7 | | |
| 8 | | |
| 9 | | |
| 10 | | |
| 11 | SW | fae.fcp_enabled |
| 12 | SW | logical_port.mac_learning_enabled |
| 13 | SW | LogicalPort.port_blocked |
| 14 | | logicalport.rsvd0 |
| 15 | | logicalport.rsvd1 |
| 16 | SW | destinaiton_lookup.pkt_for_us |
| 17 | SW | smac_lookup.smac_miss |
| 18 | SW | gateway_dmac.is_routed_packet |
| 19 | SW | bridge_domain.ipv4_routing_en |
| 20 | SW | bridge_domain.ipv6_routing_en |
| 21 | | egress_vlan_dscp_overwrite |
| 22 | | egress_ip_dscp_overwrite |
| 23 | SW/HWR | ECN capable |
| 24 | SW/HWR | logica_port.cut_through_disabled |
| 25 | SW/HWR | FCP_FLAG |
| 26 | HW | FWD_DROP |
| 27 | SW/HWR | NH_DROP |
| 28 | HW | PLCT_DROP |
| 29 | HW | egress_mtu_check_fail |
| 30 | HW | Software Error |

FIG. 7C

| | 31 | HW | Hardware Error |

| Metadata.Field Vector | | |
|---|---|---|
| Start Nibble Position | Size (nibbles) | |
| 0 | 4 | (Range0, Range 1) |
| 4 | 1 | Iteration Count |
| 5 | 1 | Traffic Class |
| 6 | 1 | Packet Color |
| 7 | 1 | Ingress Stream Type |
| 8 | 1 | egress_qos_map_profile |
| 9 | 1 | Nexthop QOS Profile |
| 10 | 8 | Nexthop Label |
| 18 | 4 | Nexthop Index (Overloaded: rewrite instruction profile) |
| 22 | 3 | Counter 0 |
| 25 | 3 | Counter 1 |
| 28 | 3 | Counter 2 |
| 31 | 3 | Counter 3 |
| 34 | 2 | Meter 0 |
| 36 | 2 | Meter 1 |
| 38 | 2 | Sampler0 |
| 40 | 2 | Sampler1 |
| 42 | 2 | Egress Stream |
| 44 | 1 | Egress Queue |
| 45 | 1 | Egress vlan cos |
| 46 | 2 | Egress ip dscp |
| 48 | 3 | Internal VLAN |
| 51 | 1 | Port QOS profile |
| 52 | 2 | Bridge Domain ID |
| 54 | 1 | VRF ID |
| 55 | 3 | Egress encap VLAN |
| 58 | 2 | Exception Code |
| 60 | 2 | Exception Detail |
| 62 | 2 | Port ACL label |
| 64 | 2 | Port QOS label |
| 66 | 2 | L3IF_ACL_label |
| 68 | 2 | L3IF_QOS_label |
| 70 | 2 | Egress stream label |

FIG. 7C (continued)

FLEXIBLE PROCESSING OF NETWORK PACKETS

CROSS REFERENCE

This application claims the benefit of U.S. Provisional Patent Application No. 62/642,798 filed on Mar. 14, 2018, which is hereby incorporated by reference herein in its entirety.

TECHNICAL FIELD

The disclosure relates to computer networks and, more particularly, to processing information communicated, or to be communicated, over a network.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems.

In most data centers, clusters of storage systems and application servers are interconnected via a high-speed switch fabric provided by one or more tiers of physical network switches and routers. In some implementations, packets communicated or to be communicated over the switch fabric are parsed by a state machine specific to the type of network being used and are processed by a pipeline of fixed function functional blocks.

SUMMARY

Aspects of this disclosure describes techniques for parsing network packets, processing network packets, and modifying network packets before forwarding the modified network packets over a network. The present disclosure describes a system that, in some examples, parses network packets, generates data describing or specifying attributes of the packet, identifies operations to be performed when processing a network packet, performs the identified operations, generates data describing or specifying how to modify and/or forward the packet, modifies the packet, and/or outputs the modified packet to another device or system, such as a switch.

In accordance with one or more aspects of the present disclosure, techniques described herein include parsing network packets to generate data, referred to in some examples as a parsed result vector, describing or specifying attributes of the packet. Based on the parsed result vector, a number of operations may be identified and performed to generate data, referred to in some examples as metadata, that describes how to modify and/or forward the packet. In some examples, network packets may be parsed by a set of parallel parsing devices, some of which share certain hardware used for the parsing. Further, in some examples, at least some of the operations may be performed by a series of flexible forwarding engines, where each of the flexible forwarding engines perform one or more operations that each updates metadata received from an earlier flexible forwarding engine or other block. The resulting metadata produced by the operations may, in some examples, be used to identify rewrite instructions that, when executed, modify the packet. The modified packet may be consumed by another functional block, such as one that forwards the packet on the network.

Techniques in accordance with one or more aspects of the present disclosure may provide several technical advantages. For instance, the manner in which parsing is performed in some examples may be flexible enough to enable parsing, by the same system, of multiple types of network packets. Further, aspects of one or more systems described herein may further enable high speed yet flexible parsing of multiple types of network packets in an efficient manner. For instance, in some examples, multiple parsing devices may be used in parallel, and techniques for sharing aspects of the parsing devices may be employed to attain high parsing rates.

In one example, this disclosure describes a method comprising identifying, by a device and based on a subset of data within a packet header that is referenced by a pointer, and further based on a parser state, a match index; identifying, by the device and based on the match index, sequence instructions stored in sequence memory included within the device; executing, by the device, the sequence instructions to determine an updated parser state and an updated pointer, wherein the updated pointer references a new subset of data within the packet header; identifying, by the device, action instructions stored in action memory included within the device; executing, by the device, the action instructions, wherein executing the action instructions includes storing attributes of the packet header; storing, by the device in one or more registers included within the device, information about the updated parser state; and identifying, by the content addressable memory and based on the new subset of data and the updated parser state, a new match index.

In another example, this disclosure describes a method comprising parsing, by a device, a packet header from a network packet; determining, by the device and based on the parsing of the packet header, a structure for a parsed result vector; storing, by the device and within the parsed result vector, information about the structure of the parsed result vector; and storing, by the device and within the parsed result vector and according to the structure of the result vector, information about attributes of the packet.

In another example, this disclosure describes a method comprising receiving, by a device, a parsed result vector and input metadata, wherein the parsed result vector includes information derived from a packet header included within a network packet, and wherein the input metadata includes information about how to forward the network packet on a network; performing, by the device and based on the parsed result vector and the metadata, at least one operation comprising a lookup in a first table and a lookup in a second table, wherein the second table is larger than the first table; generating, by the device and based on the results of the lookup in the first table and the lookup in the second table, updated metadata that includes further information about how to forward the packet on the network; and outputting, by the device, the updated metadata.

In another example, this disclosure describes a method comprising receiving, by a system, a parsed result vector, wherein the parsed result vector includes information derived from parsing a packet header of a network packet; determining, by the system and based on the parsed result vector, a plurality of sequential operations to perform; performing, by the system, the plurality of sequential operations to generate metadata that includes information about how to forward the network packet on the network; and modifying, by the system and based on the metadata, the network packet.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 5B is an example structure of a parsed result vector generated by an example parser, in accordance with one or more aspects of the present disclosure.

FIG. 5C and FIG. 5D are illustrations of the type of data that may be included in a parsed result vector generated by an example parser, in accordance with one or more aspects of the present disclosure.

FIG. 7C is an illustration of the type of data that may be included in metadata generated by an example forwarding pipeline, in accordance with one or more aspects of the present disclosure.

DETAILED DESCRIPTION

Figure 1:
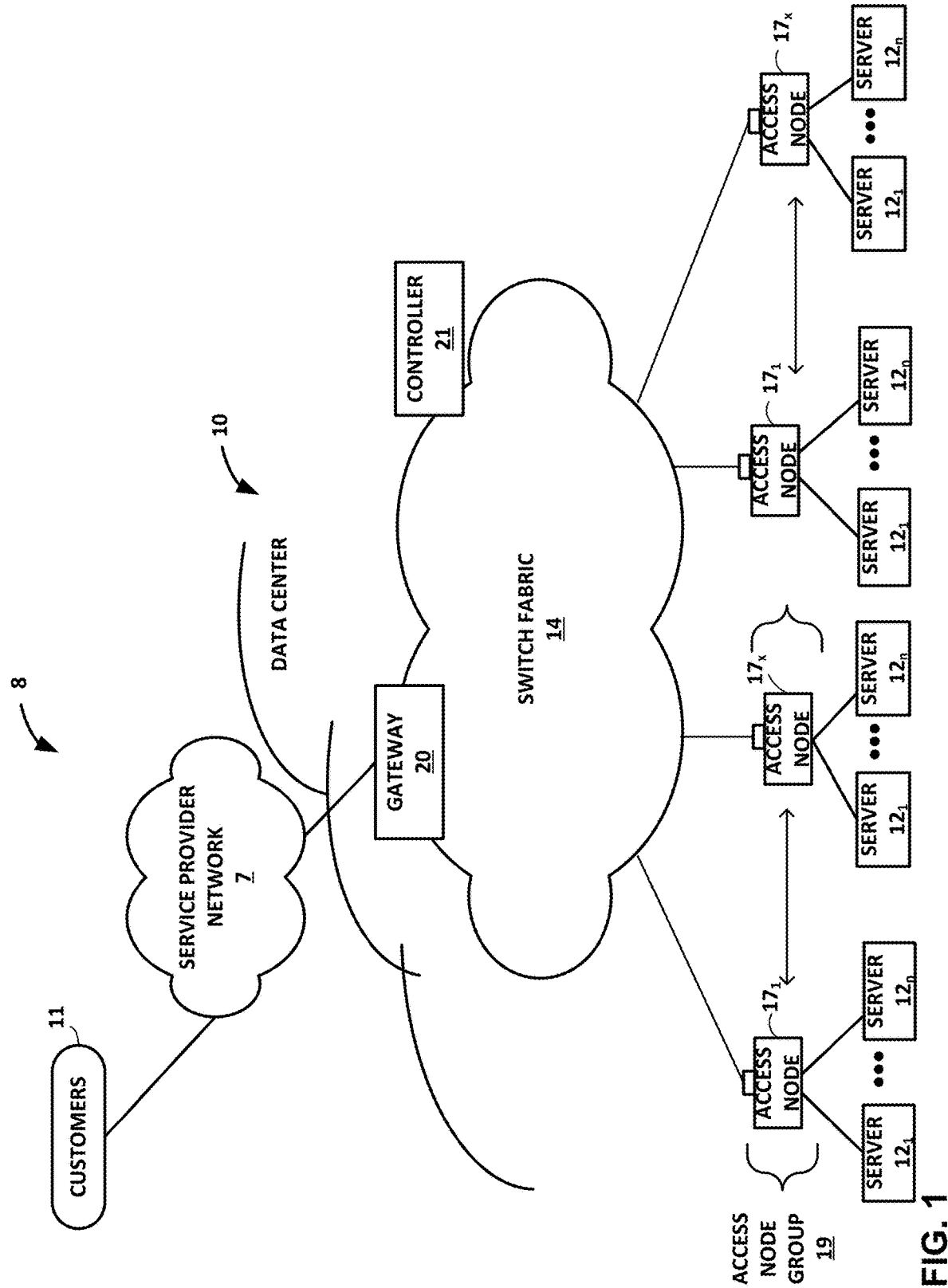
FIG. 1 is a block diagram illustrating an example system including a data center, in accordance with one or more aspects of the present disclosure.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage systems and application servers 12 interconnected via a high-speed switch fabric 14. In some examples, servers 12 are arranged into multiple different server groups, each including any number of servers up to, for example, n servers $12_1$-$12_N$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more aspects of this disclosure. In some examples, SDN controller 21 may operate in response to configuration input received from a network administrator.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17. As further described herein, in one example, each access node 17 is a highly programmable I/O processor specially designed for offloading certain functions from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers.

In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$-$17_X$. As such, multiple access nodes 17 may be grouped (e.g., within a single electronic device or network appliance), referred to herein as an access node group 19, for providing services to a group of servers supported by the set of access nodes internal to the device. In one example, an access node group 19 may comprise four access nodes 17, each supporting four servers so as to support a group of sixteen servers.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers).

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

According to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. For example, example network architectures and techniques are described in which access nodes, in example implementations, spray individual packets for packet flows between the access nodes and across some or all of the multiple parallel data paths in the data center switch fabric 14 and reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide any of the technical advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support.

As further described herein, access nodes 17 of FIG. 1 may receive a stream of packets from one or more servers 12, and parse, process, and/or modify the packets before forwarding the packets over switch fabric 14. In some examples, access nodes 17 may parse packets to generate data describing attributes of each packet, and based on the data, perform operations to generate further data and/or instructions to describe how to modify and/or forward the packet. Each packet may then be modified in accordance with the instructions and forwarded over switch fabric 14.

The techniques may provide certain technical advantages. For example, the techniques may enable flexible parsing of multiple types of network packets in a high-speed and efficient manner. Further, the techniques may enable efficient and high-speed parsing of packets being forwarded over switch fabric 14. In some examples, aspects of the parsing process may be performed in parallel to attain high parsing rates.

Aspects of this disclosure relate to the disclosure of U.S. Provisional Patent Application No. 62/566,060, filed Sep. 29, 2017, entitled "Fabric Control Protocol for Data Center Networks with Packet Spraying over Multiple Alternate Data Paths," the entire content of which is incorporated herein by reference.

Figure 2:
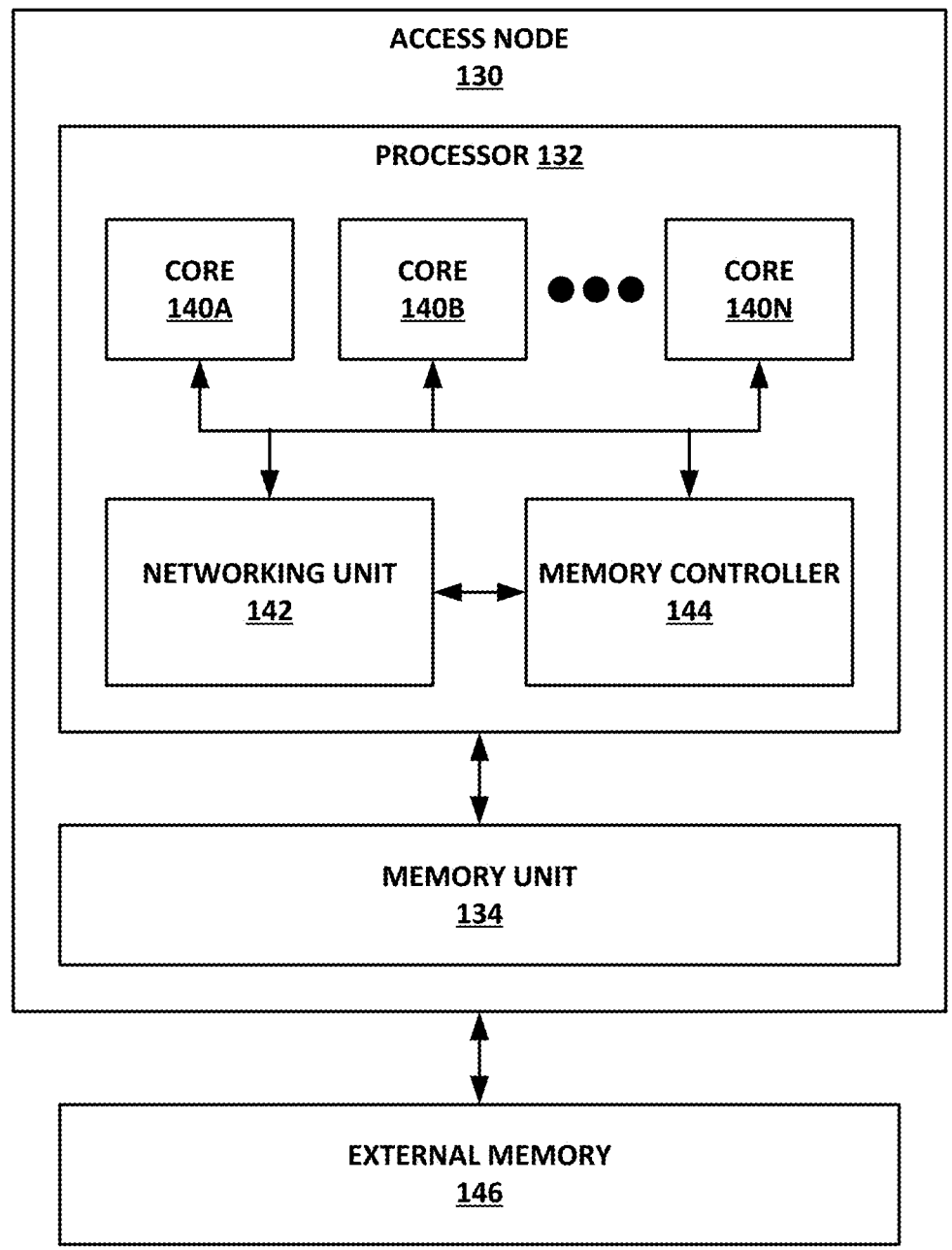
FIG. 2 is a block diagram illustrating an example access node including a networking unit and two or more processing cores, in accordance with one or more aspects of the present disclosure.

FIG. 2 is a block diagram illustrating an example access node 130 including a networking unit 142 and two or more processing cores 140A-140N (collectively "cores 140"). Access node 130 generally represents a hardware chip implemented in digital logic circuitry. As various examples, access node 130 may be provided as an integrated circuit mounted on a motherboard of a computing device or installed on a card connected to the motherboard of the computing device via PCIe, or the like. In some examples, access node 130 may be an integrated circuit within an access node group (e.g., one of access node groups 19) configured as a standalone network device for installation within a compute rack, a storage rack, or a converged rack.

Access node 130 may operate substantially similar to any of the access nodes 17 of FIG. 2. Thus, access node 130 may be communicatively coupled to a data center fabric (e.g., switch fabric 14), one or more server devices (e.g., server nodes 12 or servers 52), storage media (e.g., solid state storage 41 of FIG. 2), one or more network devices, random access memory, or the like, e.g., via PCIe, Ethernet (wired or wireless), or other such communication media in order to interconnect each of these various elements.

In the illustrated example of FIG. 2, access node 130 includes a multi-core processor 132 having a plurality of cores 140 coupled to an on-chip memory unit 134. In some examples, memory unit 134 may include a cache memory. In other examples, memory unit 134 may include two types of memory or memory devices, namely coherent cache memory and non-coherent buffer memory. Processor 132 includes a plurality of cores 140. In some examples, processor 132 may include at least two processing cores. In one specific example, processor 132 may include six processing cores 140. Processor 132 also includes a networking unit 142 and a memory controller 144. As illustrated in FIG. 2, each of cores 140, networking unit 142, memory controller 144 and memory unit 134 are communicatively coupled to each other. In addition, access node 130 is coupled to an off-chip external memory 146. External memory 146 may comprise random access memory (RAM) or dynamic random access memory (DRAM).

In this example, access node 130 represents a high performance, hyper-converged network, storage, and data processor and input/output hub. Cores 140 may comprise one or more of microprocessor without interlocked pipeline stages (MIPS) cores, advanced reduced instruction set computing (RISC) machine (ARM) cores, performance optimization with enhanced RISC-performance computing (PowerPC) cores, RISC five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

In some examples, the plurality of cores 140 may be capable of processing a plurality of events related to each data packet of one or more data packets, received by networking unit 142, in a sequential manner using one or more work units. In general, work units are sets of data exchanged between cores 140 and networking unit 142 where each work unit may represent one or more of the events related to a given data packet. In some examples, in processing the plurality of events related to each data packet, a first one of the plurality of cores 140, e.g., core 140A, may process a first event of the plurality of events. Moreover, first core 140A may provide to a second one of plurality of cores 140, e.g., core 140B, a first work unit of the one or more work units. Furthermore, second core 140B may process a second event of the plurality of events in response to receiving the first work unit from first core 140B.

Access node 130 may act as a combination of a switch/router and a number of network interface cards. Networking unit 142 includes a forwarding pipeline implemented using flexible engines (e.g., a parser engine, a look-up engine, and a rewrite engine) and supports features of IP transit switching. For example, networking unit 142 may be configured to receive one or more data packets from and transmit one or more data packets to one or more external devices, e.g., network devices. Networking unit 142 may use processing cores to perform network interface card (NIC) functionality, packet switching, and the like, and may use large forwarding tables and offer programmability. Networking unit 142 may include one or more hardware direct memory access (DMA) engine instances (not shown) configured to fetch packet data for transmission. The packet data may be in buffer memory of on-chip memory unit 134 or off-chip external memory 146, or in host memory.

Networking unit 142 may expose Ethernet ports for connectivity to a network, such as switch fabric 14 of FIG. 1. In this way, access node 130 supports one or more high-speed network interfaces, e.g., Ethernet ports, without the need for a separate network interface card (NIC). Although not illustrated in FIG. 2, access node 130 may include one or more interfaces for connectivity to host devices (e.g., servers) and data storage devices, e.g., solid state drives (SSDs) via PCIe lanes. Access node 130 may also include one or more high bandwidth interfaces for connectivity to off-chip external memory 146.

In some examples, processor 132 may further include one or more accelerators (not shown) configured to perform acceleration for various data-processing functions, such as lookups, matrix multiplication, cryptography, compression, regular expressions, or the like. For example, the accelerators may comprise hardware implementations of look-up engines, matrix multipliers, cryptographic engines, compression engines, regular expression interpreters, or the like.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management techniques. For example, memory controller 144 may be capable of mapping accesses from one of the cores 140 to a cache memory or a buffer memory of memory unit 134. In some examples, memory controller 144 may map the accesses based on one or more of an address range, an instruction or an operation code within the instruction, a special access, or a combination thereof.

More details on access nodes, including their operation and example architectures, are available in U.S. Provisional Patent Application No. 62/483,844, filed Apr. 10, 2017, entitled "Relay Consistent Memory Management in a Multiple Processor System," U.S. Provisional Patent Application No. 62/530,691, filed Jul. 10, 2017, entitled "Data Processing Unit for Computing Devices," and U.S. Provisional Patent Application No. 62/559,021, filed Sep. 15, 2017, entitled "Access Node for Data Centers," the entire content of each of which is incorporated herein by reference.

Figure 3:
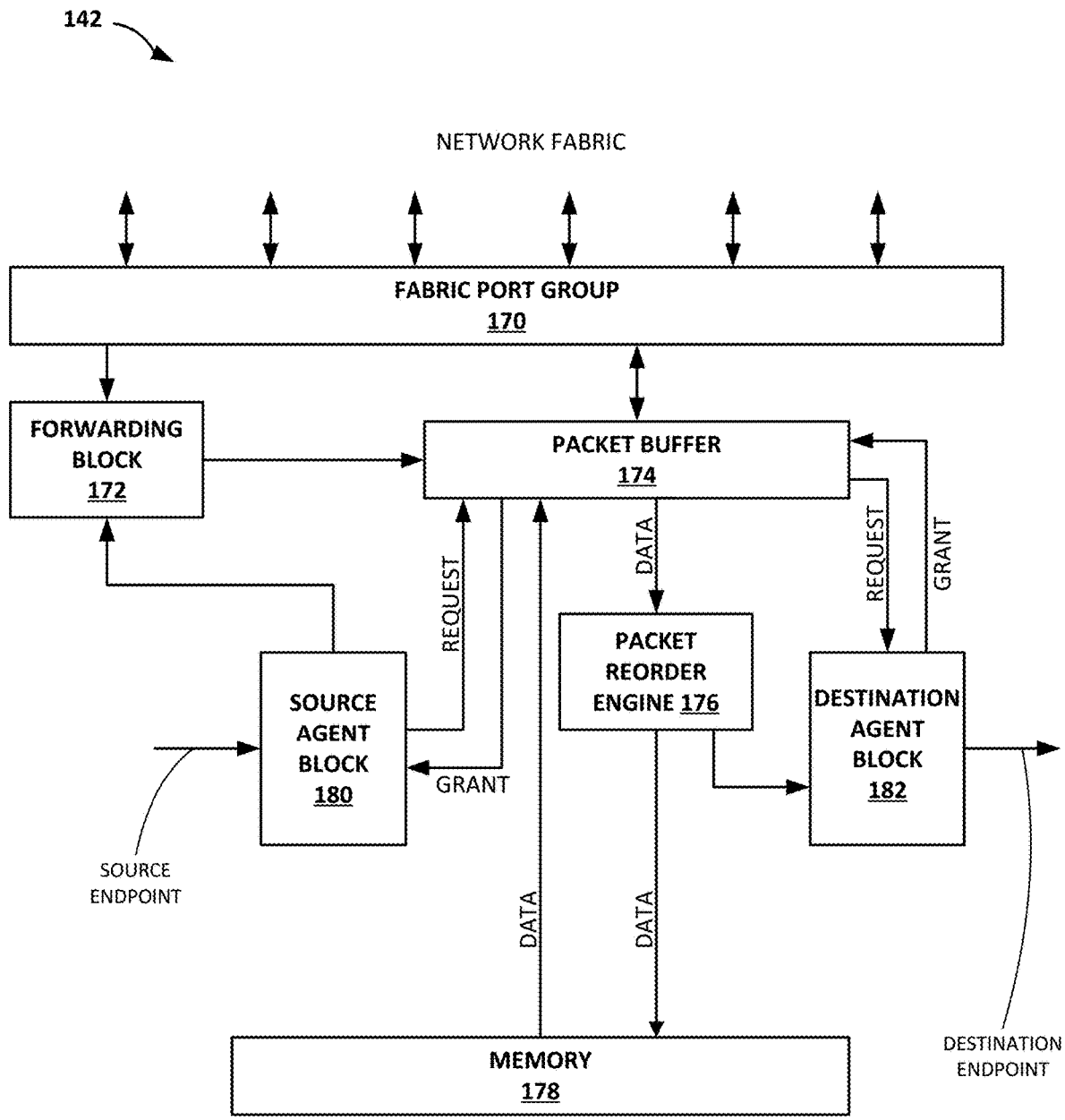
FIG. 3 is a block diagram illustrating an example networking unit of an access node, in accordance with one or more aspects of the present disclosure.

FIG. 3 is a block diagram illustrating an example networking unit 142 of access node 130 from FIG. 2, in more detail. Networking unit (NU) 142 exposes Ethernet ports, also referred to herein as fabric ports, to connect access node 130 to the switch fabric. NU 142 connects to processing cores 140 and external servers and/or storage devices, such as SSD devices, via endpoint ports. NU 142 supports switching packets from one fabric port to another fabric port without storing the complete packet (i.e., transit switching), which helps to achieve low latency for transit traffic. In this way, NU 142 enables creation of a fabric of access nodes with or without external switching elements. NU 142 may fulfill the following roles: (1) transmit packets from PCIe devices (servers and/or SSDs) to the switch fabric and receive packets from the switch fabric and send them to the PCIe devices; (2) support switching packets from one fabric port to another fabric port; (3) support sending network control packets to an access node controller; and (4) implement fabric control protocol (FCP) tunneling. Further information about the fabric control protocol are available in of U.S. Provisional Patent Application No. 62/566,060, filed Sep. 29, 2017, entitled "Fabric Control Protocol for Data Center Networks with Packet Spraying over Multiple Alternate Data Paths," the entire content of which is incorporated herein by reference.

As illustrated in FIG. 3, NU 142 includes a fabric port group (FPG) 170. In other examples, NU 142 may include multiple FPGs 170. FPG 170 includes two or more fabric ports connected to the switch network. FPG 170 is configured to receive Ethernet packets from the switch fabric and transmit packets to the switch fabric. FPG 170 may be responsible for generating and receiving link pause and priority flow control (PFC) frames.

In the example shown, NU 142 includes a forwarding block 172 to forward the packets coming from the fabric ports of FPG 170 and from the endpoint ports of source agent block 180. In the receive direction, FPG 170 or forwarding block 172 may have a flexible parser to parse incoming bytes and generate a parsed result vector (PRV). In the transmit direction, FPG 170 or forwarding block 172 may have a packet rewrite sub-unit to modify the outgoing packets based on the rewrite instructions stored with the packet.

Forwarding block 172 may include a pipeline configured to process one PRV, received from FPG 170 and/or source agent block 180, every cycle. The forwarding pipeline of forwarding block 172 may include the following processing sections: attributes, ingress filter, packet lookup, nexthop resolution, egress filter, packet replication, and statistics.

In the attributes processing section, different forwarding attributes, such as virtual layer 2 interface, virtual routing interface, and traffic class, are determined. These forwarding attributes are passed to further processing sections in the pipeline. In the ingress filter processing section, a search key can be prepared from different fields of a PRV and searched against programmed rules. The ingress filter block can be used to modify the normal forwarding behavior using the set of rules. In the packet lookup processing section, certain fields of the PRV are looked up in tables to determine the nexthop index. The packet lookup block supports exact match and longest prefix match lookups.

In the nexthop resolution processing section, nexthop instructions are resolved and the destination egress port and the egress queue are determined. The nexthop resolution block supports different nexthops such as final nexthop, indirect nexthop, equal cost multipath (ECMP) nexthop, and weighted cost multipath (WCMP) nexthop. The final nexthop stores the information of the egress stream and how egress packets should be rewritten. The indirect nexthop may be used by software to embed an address of the nexthop in memory, which can be used to perform an atomic nexthop update.

In the egress filter processing section, packets are filtered based on the egress port and the egress queue. In most examples, the egress filter block cannot change the egress destination or egress queue, but can sample or mirror packets using the rule sets. If any of the processing stages has determined to create a copy of a packet, the packet replication block generates its associated data. NU 142 might create one extra copy of the incoming packet. The statistics processing section has a set of counters to collect statistics for network management purpose. The statistics block also supports metering to control packet rate to some of the ports or queues.

NU 142 also includes a packet buffer 174 to store packets for port bandwidth oversubscription. Packet buffer 174 may be used to store three kinds of packets: (1) transmit packets received from processing cores 140 on the endpoint ports of source agent block 180 to be transmitted to the fabric ports of FPG 170; (2) receive packets received from the fabric ports of FPG 170 to the processing cores 140 via the endpoint ports of destination agent block 182; and (3) transit packets coming on the fabric ports of FPG 170 and leaving on the fabric ports of FPG 170.

Packet buffer 174 keeps track of memory usage for traffic in different directions and priority. Based on a programmed profile, packet buffer 174 may decide to drop a packet if an egress port or queue is very congested, assert flow control to a work unit scheduler, or send pause frames to the other end. The key features supported by packet buffer 174 may include: cut-through for transit packets, weighted random early detection (WRED) drops for non-explicit congestion notification (ECN)-aware packets, ECN marking for ECN aware packets, input and output based buffer resource management, and PFC support.

Packet buffer 174 may have the following sub-units: packet writer, packet memory, cell link list manager, packet queue manager, packet scheduler, packet reader, resource manager, and cell free pool. The packet writer sub-unit collects flow control units (flits) coming from FPG 170, creates cells and writes to the packet memory. The packet writer sub-unit gets a Forwarding Result Vector (FRV) from forwarding block 172. The packet memory sub-unit is a collection of memory banks. In one example, the packet memory is made of 16K cells with each cell having a size of 256 bytes made of four microcells each having a size of 64 bytes. Banks inside the packet memory may be of 2Pp (1 write port and 1 read port) type. The packet memory may have raw bandwidth of 1 Tbps write and 1 Tbps read bandwidth. FPG 170 has guaranteed slots to write and to read packets from the packet memory. The endpoint ports of source agent block 180 and destination agent block 182 may use the remaining bandwidth.

The cell link list manager sub-unit maintains a list of cells to represent packets. The cell link list manager may be built of 1 write and 1 read port memory. The packet queue manager sub-unit maintains a queue of packet descriptors for egress nodes. The packet scheduler sub-unit schedules a packet based on different priorities among the queues. For example, the packet scheduler may be a three-level scheduler: Port, Channel, Queues. In one example, each FPG port of FPG 170 has sixteen queues, and each endpoint port of source agent block 180 and destination agent block 182 has eight queues.

For scheduled packets, the packet reader sub-unit reads cells from packet memory and sends them to FPG 170. In some examples, the first 64 bytes of the packet may carry rewrite information. The resource manager sub-unit keeps track of usage of packet memory for different pools and queues. The packet writer block consults the resource manager block to determine if a packet should be dropped. The resource manager block may be responsible to assert flow control to a work unit scheduler or send PFC frames to the ports. The cell free pool sub-unit manages a free pool of packet buffer cell pointers. The cell free pool allocates cell pointers when the packet writer block wants to write a new cell to the packet buffer memory, and deallocates cell pointers when the packet reader block dequeues a cell from the packet buffer memory.

NU 142 includes source agent control block 180 and destination agent control block 182 that, collectively, are responsible for FCP control packets. In other examples, source agent control block 180 and destination control block 182 may comprise a single control block. Source agent control block 180 generates FCP request messages for every tunnel. In response to FCP grant messages received in response to the FCP request messages, source agent block 180 instructs packet buffer 174 to send FCP data packets based on the amount of bandwidth allocated by the FCP grant messages. In some examples, NU 142 includes an endpoint transmit pipe (not shown) that sends packets to packet buffer 174. The endpoint transmit pipe may perform the following functions: packet spraying, packet fetching from memory 178, packet segmentation based on programmed MTU size, packet encapsulation, packet encryption, and packet parsing to create a PRV. In some examples, the endpoint transmit pipe may be included in source agent block 180 or packet buffer 174.

Destination agent control block 182 generates FCP grant messages for every tunnel. In response to received FCP request messages, destination agent block 182 updates a state of the tunnel and sends FCP grant messages allocating bandwidth on the tunnel, as appropriate. In response to FCP data packets received in response to the FCP grant messages, packet buffer 174 sends the received data packets to packet reorder engine 176 for reordering and reassembly before storage in memory 178. Memory 178 may comprise an on-chip memory or an external, off-chip memory. Memory 178 may comprise RAM or DRAM, for instance. In some examples, NU 142 includes an endpoint receive pipe (not shown) that receives packets from packet buffer 174. The endpoint receive pipe may perform the following functions: packet decryption, packet parsing to create a PRV, flow key generation based on the PRV, determination of one of processing cores 140 for the incoming packet and allocation of a buffer handle in buffer memory, send the incoming FCP request and grant packets to destination agent block 182, and write the incoming data packets to buffer memory with the allocated buffer handle.

Figure 4:
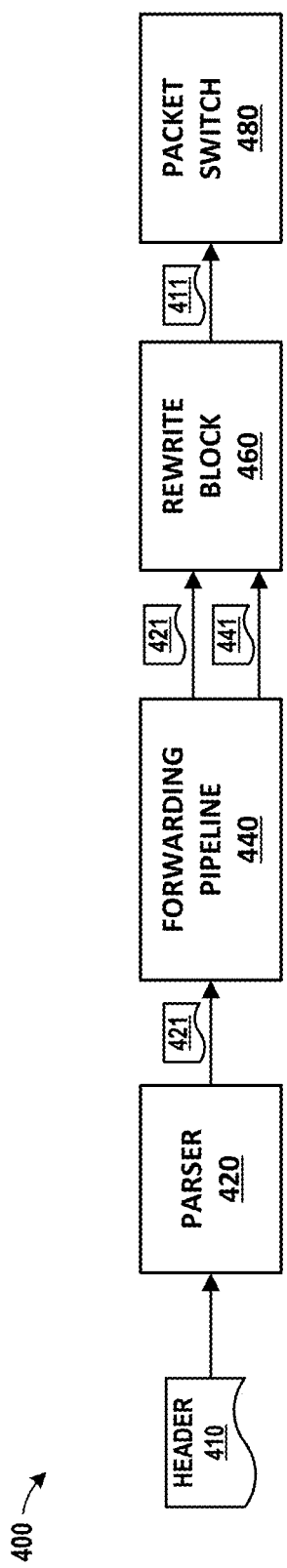
FIG. 4 is a conceptual diagram illustrating an example system for parsing, processing, and/or rewriting a network packet, in accordance with one or more aspects of the present disclosure.

FIG. 4 is a conceptual diagram illustrating an example system for parsing, processing, and/or rewriting a network packet, in accordance with one or more aspects of the present disclosure. System 400 shows an overall processing flow for packets within, for example, networking unit 142 of FIG. 3. As illustrated in the example of FIG. 4, system 400 includes parser 420, forwarding pipeline 440, rewrite block 460, and packet switch 480. In some examples, system 400 may perform processing relating to a packet header 410 received by an access node 17 from one of servers 12, or received by access node 17 over switch fabric 14 intended for one of servers 12. The processing performed by system 400 may depend on a number of factors, such as the type of packet headers included within packet header 410, the forwarding type, egress stream type, and other considerations.

Parser 420 parses packets and may accept input at fixed or variable rates. For instance, in the example of FIG. 4, parser 420 receives a stream of packets as input. Included within the each of the packets is a packet header 410 for the packet. Packet header 410 may be included within a packet received from a port within fabric port group 170, or received from one of servers 12. In some examples, parser 420 may receive data (i.e., packets) arriving at a fixed rate from a port (e.g., over FPG 170). In such an example, if parser 420 is not fast enough to process the stream of data, dropped packets may result. In other examples, parser 420 may receive data from memory, in which case dropped packets are less likely to result if parser 420 does not parse the stream of data fast enough, since back-pressuring the memory may be possible.

Parser 420 may generate parsed result vector 421. For instance, in the example of FIG. 4, parser 420 evaluates the data within packet header 410 and generates parsed result vector 421. In some examples, the format of parsed result vector 421 may be flexible and may include a template identifier that describes the structure of the fields within parsed result vector 421. Later blocks (e.g., forwarding pipeline 440) may use the template to interpret parsed result vector 421 and perform operations based on the contents of parsed result vector 421.

Forwarding pipeline 440 may process parsed result vector 421 to generate metadata 441. For instance, in the example of FIG. 4, forwarding pipeline 440 receives parsed result vector 421 and uses parsed result vector 421, which may include a template describing the format of parsed result vector 421, to identify a number of operations to perform or to be performed on packet header 410. In some examples, forwarding pipeline 440 may generate one or more search keys based on parsed result vector 421 and use the search keys to search against programmed rules. In other examples, forwarding pipeline 440 may use fields within parsed result vector 421 to perform lookups in tables included within forwarding pipeline 440. As a result of such operations, forwarding pipeline 440 generates metadata 441. Metadata 441 serves as a dynamic state describing operations to be performed on the packet, which may include operations to be performed on packet header 410. In the example shown, forwarding pipeline 440 outputs metadata 441 to rewrite block 460. Forwarding pipeline 440 also outputs parsed result vector 421 to rewrite block 460, but in some examples, forwarding pipeline 440 does not modify parsed result vector 421. In examples where parsed result vector 421 is not modified by forwarding pipeline 440, forwarding pipeline 440 may access parsed result vector 421 in read-only memory. In such examples, such memory may be optimized for speed, since the memory does not need to support modifications to the stored data.

Rewrite block 460 may, based on metadata 441, modify packet header 410. For instance, in the example of FIG. 4, rewrite block 460 receives parsed result vector 421 and metadata 441. Rewrite block 460 determines, based on metadata 441, a pointer to a set of rewrite instructions that specify how packet header 410 is to be modified. Rewrite block 460 executes the rewrite instructions, thereby modifying packet header 410. Rewrite block 460 outputs modified packet 411 to another block, such as packet switch 480.

FIG. 4 illustrates one example implementation of system 400. Although examples are described herein in terms of specific functional blocks, techniques described herein may apply to other systems comprising different functional blocks, and the scope of this disclosure is not limited to the configuration of FIG. 4. Accordingly, other example or alternative implementations of system 400 may be appropriate in other instances. Such implementations may include a subset of the devices and/or components included in the example of FIG. 4 and/or may include additional devices and/or components not shown in FIG. 4. Therefore, although one or more implementations of system 400 may be described with reference to FIG. 4, system 400 may be implemented in a number of different ways.

For instance, one or more devices of system 400 that may be illustrated as separate devices may alternatively be implemented as a single device; one or more components of system 400 that may be illustrated as separate components may alternatively be implemented as a single component. Also, in some examples, one or more devices of system 400 that may be illustrated as a single device may alternatively be implemented as multiple devices; one or more components of system 400 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 4 may alternatively be implemented as part of another device or component not shown in FIG. 4.

Further, certain operations, techniques, features, and/or functions may be described herein as being performed by specific components, devices, and/or modules in FIG. 4. In other examples, such operations, techniques, features, and/or functions may be performed by different components, devices, or modules. Accordingly, some operations, techniques, features, and/or functions that may be described herein as being attributed to one or more components, devices, or modules in FIG. 4 may, in other examples, be attributed to other components, devices, and/or modules, even if not specifically described herein in such a manner.

Figure 5A:
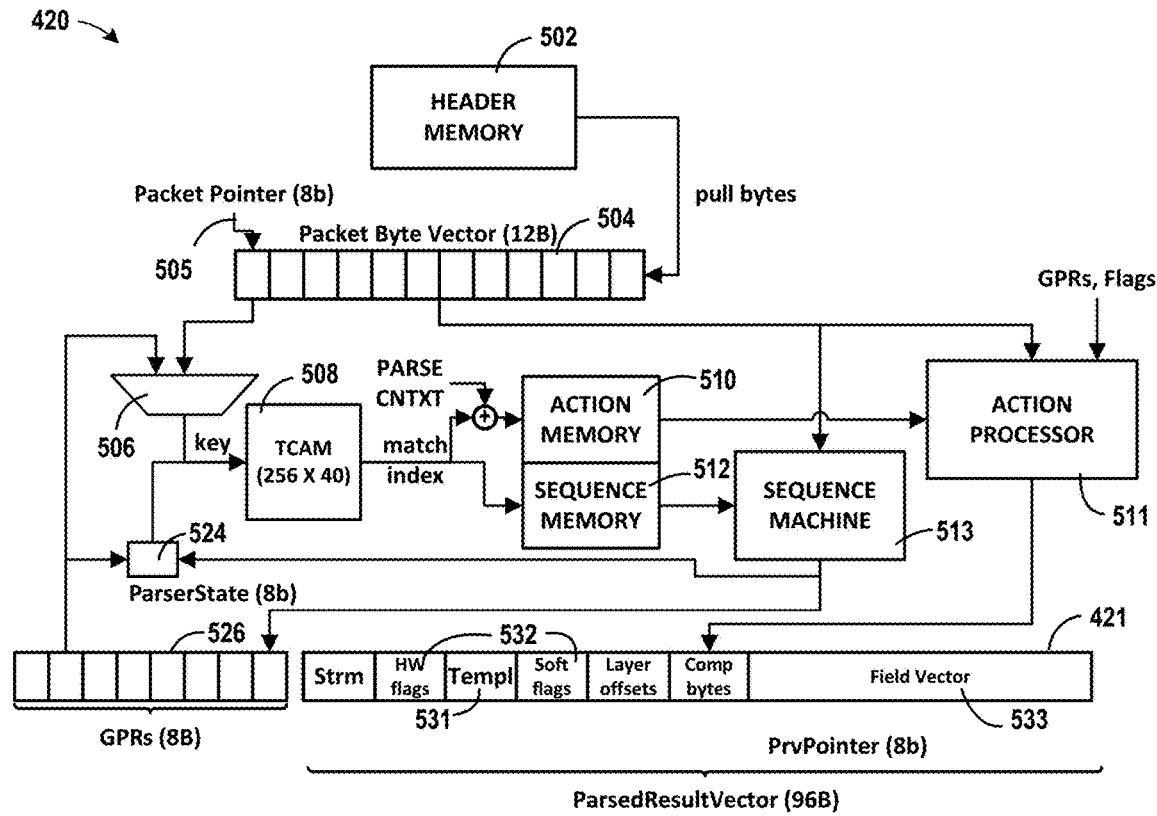
FIG. 5A is a block diagram illustrating an example system for flexibly parsing packet data, in accordance with one or more aspects of the present disclosure.

FIG. 5A is a block diagram illustrating an example system for flexibly parsing packet data, in accordance with one or more aspects of the present disclosure. Parser 420 of FIG. 5A may be described as an example or alternative implementation of parser 420 of FIG. 4, and one or more aspects of FIG. 5A may be described herein within the context of FIG. 4. In the example of FIG. 5A, parser 420 includes header memory 502, packet byte vector 504, multiplexer 506, content-addressable memory 508, action memory 510, sequence memory 512, action processor 511, sequence machine 513, and one or more general purpose registers 526. Parser 420 as illustrated in FIG. 5A generates parsed result vector 421 from packet byte vector 504, as bytes from header memory 502 are shifted into packet byte vector 504. Some of the information included in the illustration of FIG. 5A is specific to one particular implementation of parser 420 (e.g., packet byte vector 504 is 12 bytes, content-addressable memory 508 is 256 b×40 b, parser state storage 524 is 8 bits), but implementations involving other components, sizes and/or dimensions are possible.

Parser 420 may parse data received in header memory 502. For instance, in the example of FIG. 5A, data flows into header memory 502. In some examples, the data flowing into header memory 502 is packet data received over a network or from a host (e.g., one of server devices 12). Packet byte vector 504 pulls data from header memory 502 and, in the example illustrated, processes the data four bytes at a time. Subsequent bytes from the packet (or packet header) are stored in packet byte vector 504 and are waiting to be processed. Packet pointer 505 references the current set of bytes being processed.

Content-addressable memory 508, which may be a ternary content-addressable memory, accepts as input data from both packet byte vector 504 and parser state storage 524, and performs a lookup in content-addressable memory 508. For instance, in the example of FIG. 5A, four bytes from packet byte vector 504, along with information from parser state storage 524 are used to search content-addressable memory 508. If a match is found, content-addressable memory 508 identifies one or more addresses. Content-addressable memory 508 outputs the addresses, or information about the addresses, to action memory 510 and sequence memory 512. Action memory 510 and sequence memory 512 use the information from content-addressable memory 508 to determine what action to perform and how to process the packet header stored within packet byte vector 504.

Sequence machine 513 determines a new state and determines which bytes within packet byte vector 504 to parse. For instance, in the example of FIG. 5A, sequence memory 512 outputs to sequence machine 513 information at the addresses identified by content-addressable memory 508. Sequence machine 513 computes, based on the information from sequence memory 512, a new parser state. Sequence machine 513 stores the parser state in parser state storage 524. Sequence machine 513 further determines that evaluation of some of the bytes in packet byte vector 504 is not required, so sequence machine 513 may determine a number of bytes that can be skipped within packet byte vector 504. In one example, sequence machine 513 may identify and process an SMAC field of an Ethernet header, and then determine a number of bytes to skip within packet byte vector 504 to point to the next set of data to be processed (e.g., the DMAC address). Sequence machine 513 adjusts packet pointer 505 based on the determined number of bytes to skip. Further data may be shifted into packet byte vector 504 from header memory 502.

Sequence machine 513 may store, within general purpose registers 526, information that may be used later to parse information in packet byte vector 504. For instance, in some examples, the DMAC value may be required in order to compute a new state, but the DMAC value may occur very early in the bitstream. And in some situations, the DMAC value is required well after the DMAC value occurs in the bitstream. Accordingly, the DMAC value may be stored for later use in general purpose registers 526. In such an example, therefore, sequence machine 513 identifies data within the incoming data stream being processed through packet byte vector 504 that may be used later. Sequence machine 513 stores the data within one or more of general purpose registers 526. At a later time, multiplexer 506 selects data from general purpose registers 526, and uses such information to perform a lookup in content-addressable memory 508. In some examples, sequence machine 513 controls multiplexer 506 to select data from either general purpose registers 526 or from packet byte vector 504 to use as a key for content-addressable memory 508.

Action processor 511 determines actions that may be performed. For instance, in the example of FIG. 5A, action memory 510 outputs to action processor 511 information at the addresses, or information derived from the addresses identified by content-addressable memory 508. Action processor 511 determines, based on the information from action memory 510, a set of instructions and/or actions to perform. In some examples, action processor 511 populates parsed result vector 421 with information from packet byte vector 504. For instance, action processor 511 may move portions of the packet stored within packet byte vector 504 into parsed result vector 421, set flags within parsed result vector 421, store the template identifier within parsed result vector 421, or write to the field vector portion of parsed result vector 421. In one example, action processor 511 may parse SMAC and DMAC fields of an Ethernet header, and may move the DMAC into a specific portion of parsed result vector 421. In another example, action processor 511 may set various flags included within parsed result vector 421 (e.g. action processor 511 may set a VLAN flag within parsed result vector 421 if action processor 511 determines that the packet is associated with a VLAN).

In some examples, action memory 510 and sequence memory 512 could be combined into one component, but in the example of FIG. 5A, action memory 510 and sequence memory 512 are split into two components for timing reasons. The amount of time required for parser 420 to compute a new parser state may be, in the example shown, the amount of time that it takes to (1) perform a lookup within content-addressable memory 508, (2) read sequence memory 512, and (3) compute the new state based on the information read from sequence memory 512. Since a limited amount of data at a time from packet byte vector 504 is processed in one state, the speed of parser 420 is limited by the speed in which a new parser state can be computed. Accordingly, to minimize the amount of time to perform the lookup within content-addressable memory 508, read from sequence memory 512, and compute the new parser state, very fast memory for sequence memory 512 may be used. The speed of parser 420 is not as dependent upon the speed of action memory 510, so memory that is not as high-speed is less important for action memory 510. A design trade-off may therefore be appropriate for some implementations, in which action memory 510 and sequence memory 512 are each implemented differently, with faster memory being used for sequence memory 512. Such an implementation may result in a faster parsing system without a significant increase in cost.

Parsed result vector 421 includes template 531, flag fields 532, field vector 533, and other fields. Template 531 identifies the structure of parsed result vector 421. In other words, fields within parsed result vector 421 may differ when parsing different types of packets, or in different situations. Template 531 may identify a specification for the structure of parsed result vector 421, so that the fields within parsed result vector 421 can be properly interpreted by later blocks processing a packet. In particular, template 531 may be used by forwarding pipeline 440 to determine how forwarding pipeline 440 should operate and how components within forwarding pipeline 440 should work together.

Flag fields 532 include various flags describing attributes of the packet. In some examples, including in the example illustrated in FIG. 5A, flag fields 532 may be divided into flags that might only be set by hardware, and those that may be configured by software. In other examples, flag fields 532 may combine both software and hardware-based flags.

Field vector 533 includes fields used by forwarding pipeline 440 to process the packet. Such fields may include a source and destination address, a source and destination port, type information, timestamp information, length information, and header byte offset address information. Other information may also be stored within field vector 533.

Eventually, after processing a sequence of data from a packet header, parser 420 may transition to a terminate state. In the terminate state, the packet header has been processed through packet byte vector 504, and parsed result vector 421 has been populated based on the information in the packet header. Once in the terminate state, parsed result vector 421 is ready to be and/or is waiting to be processed by forwarding pipeline 440.

Parser 420 serves as a flexible parser that performs a number of preprocessing operations to identify and process the relevant portions of header memory 502 as data is shifted through packet byte vector 504. Parser 420 may parse packets conforming to a variety of different formats, such formats encompassing various encapsulation types and/or header types at various layers of the Open Standards Interconnection (OSI) or TCP/IP model, for instance. As a flexible parser, parser 420 may be configured to not only operate with current packet formats (Ethernet, IPv4, IPv6, or others), but can also be configured to parse packet formats that may be used in the future. Rules for processing any such new packet formats can be programmed into content-addressable memory 508, action memory 510, and sequence memory 512. The rules may then be implemented by action processor 511 and sequence machine 513, and thereby generate an appropriate parsed result vector 421, with a structure specified by template 531 included within parsed result vector 421.

In some examples, and as described herein, parser 420 may use a combination of a TCAM and an action processor to parse different types of packet headers. The parser receives a packet-byte stream as input and prepares a parsed result vector (PRV). The PRV contains some hard fields but its structure is primarily soft, i.e., the extracted fields may be placed at soft offsets based on configured templates. In some examples, the output of parser 420 is a 96B parsed result vector 421 that includes a template identifier (e.g. a "template index") for a template that describes the structure of the soft fields within the PRV. The template index can be later used to lookup a per-template action table to generate lookup keys to be used by downstream blocks in the forwarding pipeline (e.g., forwarding pipeline 440).

In some examples, there is more than one use-case for parser 420. For instance, parser 420 may be deployed close to fabric-facing port groups to parse packets as they are received from the network. In this example, parser 420 may mainly work on the outer headers. The inner headers may be parsed mainly to derive an entropy hash. In this example, parser 420 may be located in FPG 170 of networking unit 142.

In another example, parser 420 may be reused for packets destined to the end-points after packet buffer 174 of networking unit 142. In this example, parser 420 is located in the ERP block of networking unit 142 and parses the inner headers (after decryption if packet was encrypted).

In another example, parser 420 may be deployed in the ETP block of networking unit 142 to parse arbitrary bytes from a virtual processor and generate a PRV that is understood by the NU forwarding pipe.

In some examples, the implementation illustrated in FIG. 4 and elsewhere herein may serve as an abstract model that a compiler can use to program the machine for parsing new protocols in the future.

In the example illustrated in FIG. 5A, and as described herein, the input to parser 420 may be a set of packet bytes, denoted as Packet Byte Vector (PBV). The incoming packet is streamed through packet byte vector 504 as the bytes arrive and are consumed by the parser. The parsing may be done using a cut-through model, i.e., parsing may be started as the bytes arrive without storing all the header bytes. As parser 420 (or packet byte vector 504) consumes bytes, it pulls data from the header memory into packet byte vector 504. If header memory 502 is empty, parser 420 stalls and waits for bytes to arrive before continuing parsing. The first 4 bytes (bytes 0-3) of the PBV are generally used as a search key for the TCAM (i.e., content-addressable memory 508) lookup. Packet pointer 505 keeps track of the current offset within the packet and points to byte 0 of the PBV. Incrementing packet pointer 505 shifts bytes out of the PBV and brings in new bytes from the header memory into the PBV. The number of packet bytes to be streamed through the parser may be the first 192B of a packet, which may represent the amount of buffering per packet in the parser's header buffer. The size of parsed result vector 421 may be limited to 108B to keep implementation costs manageable.

The size of the TCAM search key in the example of FIG. 5A may be 40 b and may comprise 8 b of parserState and 32 b of key. The 32 b key can be bytes 0-3 of the PBV or can be drawn from one of general purpose registers 526. Parser 420 may use variable-size GPRs. Based on the TCAM rule match, parser 420 allows extracting fields from the PBV and placing them at desired locations in the PRV or in any GPR (or both). Fields extracted to a GPR can be later used as a search key to influence the parser state machine. Hence, GPRs are generally intended for control fields like "headerLength" or "nextHeader" fields. General purpose registers (GPRs) 526 can also be thought of as a place to store fields from a prior window (a prior state of packet byte vector 504) that can affect the parser state machine. Since the bytes from the past may be lost as the packet is streamed through packet byte vector 504, a limited number of bytes from the past can still be accessed by storing them general purpose registers 526. In some examples, parsed result vector 421 may include a flag area where each bit is individually addressable. Such flags may be further classified as hardware error flags and soft flags. Hardware error flags are used to signal known errors related to the parsing machinery. As the name implies, the meaning of the soft flags is soft and software can use these bits to encode binary information like the existence of certain fields in the PRV, error status, etc.

In the example of FIG. 5A, and as described, content-addressable memory 508 generates, based on a lookup, a matchIndex that is used to lookup two separate memories—sequence memory 512 and action memory 510. Sequence memory 512 is expected to orchestrate the parser state machine. In order to support back-to-back lookups for the same context, the instruction in sequence memory 512 memory that determines the next parser state is expected to be executed in the same cycle as the TCAM lookup. The sequencing instructions are executed by the sequence machine 513.

In addition to determining the next parser state, a set of actions may need to be performed on the bytes of the packet as referenced by packet pointer 505. These actions may involve extracting fields from packet byte vector 504 and populating parsed result vector 421. The actions can be pipelined and executed over multiple cycles. These actions are executed by action processor 511.

The throughput of parser 420 may, in some examples, be determined by the number TCAM search cycles required to parse a packet. For example, if a packet has 54B of protocol headers (14B L2+20B IP+20B TCP), and the parser consumes 6B on an average every cycle, a new packet can be parsed every 9 cycles, resulting in a 111 Mpps throughput. On the other hand, if the parser has to examine 128B of headers and consumes only 4B on average every cycle, the pps reduces to 31.25 Mpps. On the line side, a single parser instance may handle a 25 G stream. This conservatively assumes a single TCAM rule should be able to consume around 3B of header. For typical networking headers, the rate of consumption can be much higher because a number of fields can be skipped over without much examination. In some examples, a TCAM rule match (e.g., performed by content-addressable memory 508) may consume at least 4B of data that was used as the lookup key. Such a design may allow for some speedup to handle cases where 4B might not be consumed in some cycles (e.g. when one or more general purpose registers 526 are used as the lookup key instead of portions of packet byte vector 504). The speedup is provided by having a PBV that is 12B and allowing a TCAM action to access up to 8B from packet pointer 505 (byte 0 of PBV). In some examples, a 2× speedup may be achieved over the required parsing rate if 8 bytes need to be skipped over or if extraction of fields within an 8B segment can be pipelined without any dependencies. The extra 4B in the PBV can be viewed as a prefetch of the key to be used in the next cycle in the event that 8 bytes are consumed in the current cycle. In some examples, the prefetching of data into packet byte vector 504 might not be visible to software. The actions of parser 420 could potentially move the packet pointer to any offset within the packet, potentially skipping a large number of bits. Hardware may implement the interlocks to rate-match the parser to the incoming data rate and pull data into packet byte vector 504 when data is available. This allows the parser to handle variable speed streams and slow streams.

FIG. 5B is an example structure of a parsed result vector generated by an example parser, in accordance with one or more aspects of the present disclosure. As illustrated in FIG. 5B, parsed result vector 421 may include a two-byte template, four bytes of fields, eight bytes of header offsets, and a ninety-six byte field vector. Included in the field vector may be a one byte stream number, and a one byte hardware error trap code. FIG. 5B illustrates one example structure of parsed result vector 421, and other structures may be appropriate in other contexts or implementations.

FIG. 5C and FIG. 5D are illustrations of the type of data that may be included in a parsed result vector generated by an example parser, in accordance with one or more aspects of the present disclosure. As illustrated in FIG. 5C and FIG. 5D, parsed result vector 421 may include a template that describes attributes of the network over which the packet is being communicated, and may further include a number of flags associated with the network. Parsed result vector 421 may further include a number of header byte offset addresses, typically one for each of the network layers. Parsed result vector 421 may also include a field vector that has a number of fields, each of varying sizes, for storing data relating to attributes of the network. Each of FIG. 5C and FIG. 5D illustrate one example implementation of parsed result vector 421, and other types of data may be included within parsed result vector 421 in other contexts or implementations.

Figure 5E:
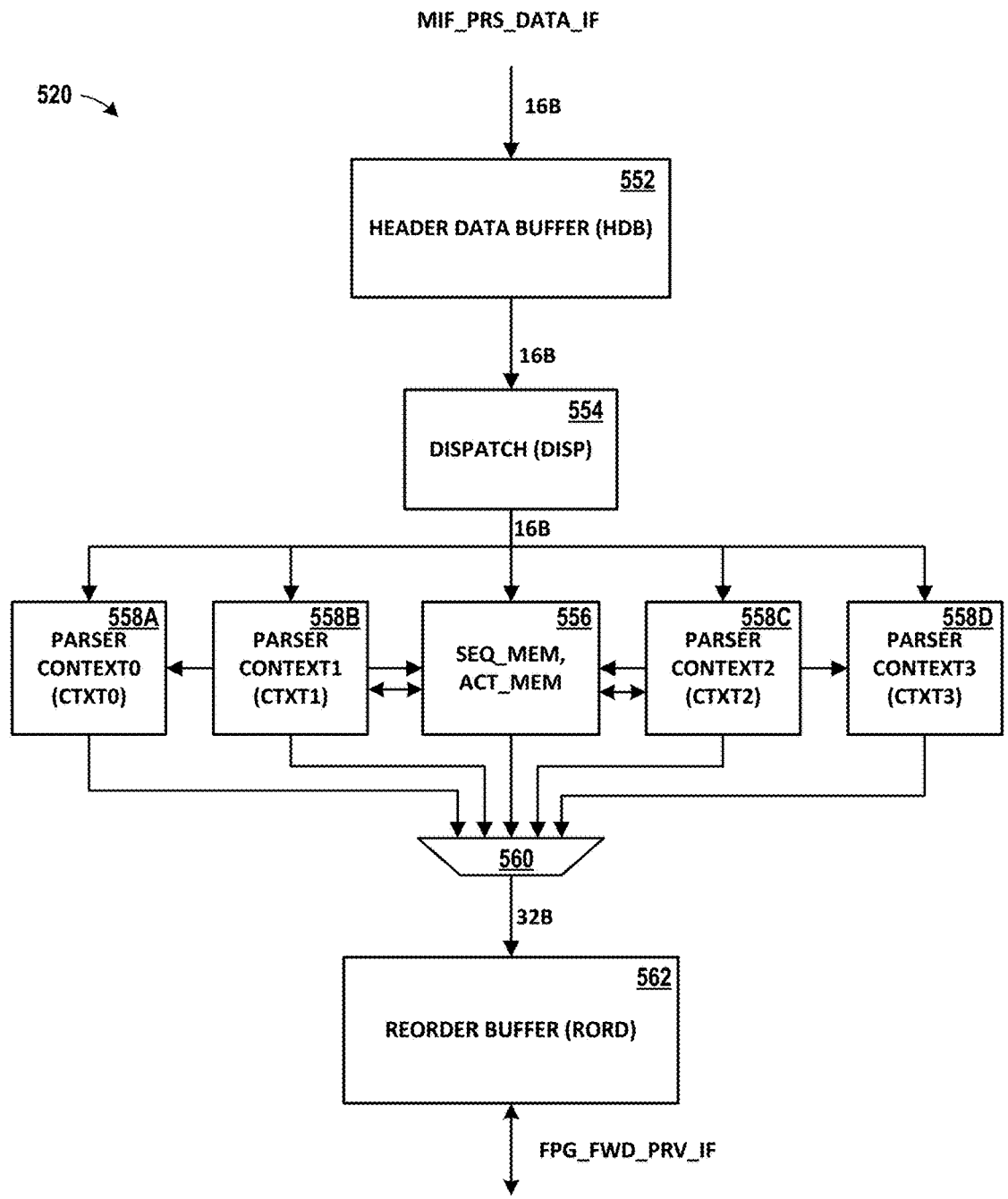
FIG. 5E is a block diagram illustrating an alternative parser in which four parsers are parse incoming packet data in parallel.

FIG. 5E is a block diagram illustrating an alternative parser in which four parsers parse incoming packet data in parallel. In the example of FIG. 5E, incoming packets pass through buffer 552, and are dispatched, by packet dispatcher 554, to one of four parsers 558 (parsers 558A through 558D). Each of parsers 558 may be implemented in a manner similar to that illustrated in FIG. 5A. In some examples, each of parsers 558 may use and/or have access to shared components 556. Shared components 556 may include content-addressable memory, sequence memory, and/or action memory shared among all four parsers 558. Accordingly, certain components or features of parser 420 of FIG. 5A may be shared among multiple parsers to increase parsing rates, while also gaining the advantages of a high-speed content-addressable memory 508 and sequence memory 512 as illustrated in FIG. 5A. Once parsed by parsers 558, the packets may be combined and reordered by reorder mux 560 and reorder buffer 562.

In the example illustrated in FIG. 5E, and as described herein, a high-speed parser (e.g., capable of handling rates on the order of 100 Gb) can be constructed by placing a number of parsers (e.g., four parsers) of the type illustrated in FIG. 5A in parallel, spraying packets to them, and finally reordering the packets based on stream order. In such an example, each of the multiple parser contexts can share the TCAM, Sequence Memory, and Action Memory, as shown in FIG. 5E using register files with a number of read ports equal to the number of parsers. In another example, action memory 510 for each of the parsers may be implemented using SRAM and replicating the RAMs to increase read bandwidth. In the 4× parser example, a parser context is bound to a stream of a specific speed (e.g., 25 Gb). In configurations involving 50 G streams, a single 50 G stream may be load-balanced across, for example, two parser contexts. For a 1×100 G configuration, the stream may be load-balanced across four parser contexts.

A reorder buffer is necessary for supporting streams faster than 25 G (50 G and 100 G). Since packets of 50 G and 100 G streams are sprayed across parser contexts, the PRVs corresponding to the packets need to be reordered before forwarding them downstream to guarantee per-stream order out of the parser. The main source of packet reorder is the difference between the minimum and maximum times it takes to parse a packet. Parsing 192B of packet header can take up to 48 cycles (before timeout) whereas parsing the smallest packet can be done in less than 10 cycles (although we are allowed to take 16 cycles for a 64B packet). This causes out-of-order-ness while generating PRVs.

In some examples, reorder buffer 562 may serve as a unified reorder buffer. For instance, the parser contexts (parsers 558) write the 96B PRV to reorder buffer 562 over a 32B interface. The write port to reorder buffer 562 is time-shared by the four parser contexts in the example of FIG. 5E. Each context stores 2 PRVs internally—one for the current packet being parsed and a second PRV for arbitrating for access to the reorder buffer. A context may, in some examples, be guaranteed a PRV write slot within 9 cycles (3 cycles per PRV×3 other contexts) and in such an example, a PRV may be written into the reorder buffer in 3 consecutive cycles. It is expected that a parser context starts processing a packet only if there is space available in its internal PRV buffer. This can limit the rate at which a parser context generates PRV to 1 every 12 cycles. This may still be faster than the expected parsing rate for min-sized 64B packets, which is 1 every 16 cycles.

In the example of FIG. 5E, when a packet is dispatched to a parser context, packet dispatcher 554 stamps a sequence number for the packet. The sequence number range may be equal to the size of the reorder buffer. When the reorder buffer space is exhausted, packet dispatcher 554 may be back-pressured. The reorder buffer may be sized at 12 entries, shared by all 4 parser contexts in the example of FIG. 5E. The sequence number may be carried through to the PRV and serve as an address in the reorder buffer where the PRV is stored. The pointer to the PRV may also be stored with the sequence number in a per-context seq_num FIFO. For a 100 G stream, when a PRV pull is received from the downstream module, a reorder pointer that keeps track of the next sequence number expected looks for the expected sequence number at the head of the four per-context seq_num FIFOs. Once the expected sequence number shows up and a PRV pull is received, the PRV is read out from the reorder buffer over six cycles (16B interface) and sent to the downstream module. A PRV read releases the sequence number after the last 16B is transmitted.

For 25 G streams, the stream multiplexing scheme to the downstream forwarding block can be a little different to optimize latency. In such an example, instead of sending the PRV in the order of dispatch, the PRVs can be sent in the order of PRV generation by the contexts with a round-robin policy across PRVs generated in the same cycle.

Figure 6:
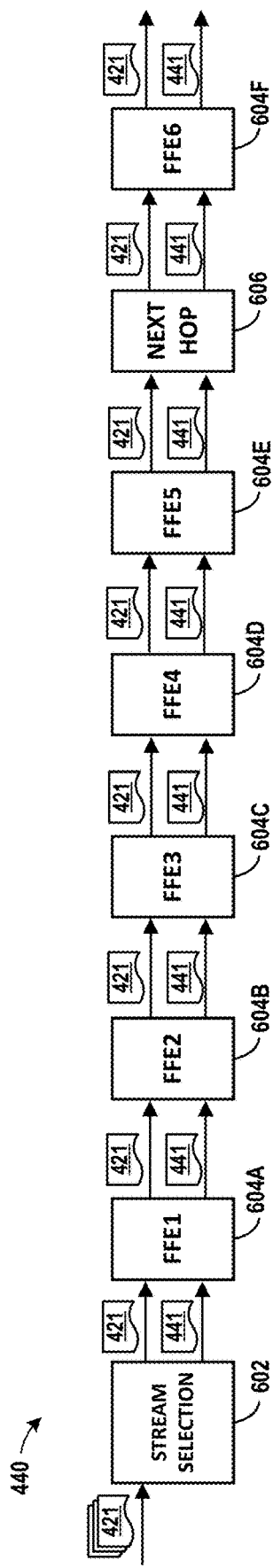
FIG. 6 is a block diagram illustrating an example pipeline of functional blocks for processing network information, in accordance with one or more aspects of the present disclosure.

FIG. 6 is a block diagram illustrating an example pipeline of functional blocks for processing network information, in accordance with one or more aspects of the present disclosure. In the example of FIG. 6, forwarding pipeline 440 includes a number of functional blocks, including stream selection block 602, flexible forwarding engines 604 (flexible forwarding engines 604A through 604F) and next hop block 606. Although a specific number of blocks are shown, forwarding pipeline 440 can be configured with various pipeline depths and blocks. In the example of FIG. 6, each block performs one or more functions. Some blocks, such as stream selection block 602 and next hop block 606, are fixed function blocks. Stream selection block 602 selects a stream and associated parsed result vector 421 (e.g., from one of parsers 558 of FIG. 5E) and passes the selected parsed result vector 421 to the next block. Next hop block 606 determines how the packet is to be forwarded. Other blocks, such as flexible forwarding engines 604, enable flexible search key construction and table lookup, and also include an action processor.

Each block accepts parsed result vector 421 as input and passes parsed result vector 421 along to the next block. In some examples, parsed result vector 421 is passed along to a next block in forwarding pipeline 440 without being modified, but parsed result vector 421 is used to define and influence the operations performed by each of the flexible forwarding engines 604 within the pipeline. Each instance of flexible forwarding engine 604 can be customized based on its expected use through programming various key engines and action processor microcode memory. In some examples, one or more of flexible forwarding engines 604 may generate one or more search keys from fields within parsed result vector 421, and perform a search using the search keys against programmed rules stored within one or more tables included in each of flexible forwarding engines 604. For instance, fields of parsed result vector 421 may be used to perform a lookup to determine the next hop index or to identify an address. Based on the results of such operations, each of flexible forwarding engines 604 may incrementally modify metadata 441 as metadata 441 is passed through forwarding pipeline 440 from block to block. Although shown in a pipeline of sequential blocks, forwarding pipeline 440 may alternatively be configured to include one or more loops whereby a flexible forwarding engine may perform multiple operations in succession. Alternatively, or in addition, one or more flexible forwarding engines 604 may be placed in parallel rather than one after another. Accordingly, metadata 441 is modified and/or updated by one or more of the blocks of forwarding pipelines 440 as parsed result vector 421 and metadata 441 are passed along forwarding pipeline 440. In the example illustrated in FIG. 6, the initial version of metadata 441 is input to flexible forwarding engine 604A, and the final modified version of metadata 441 is output by flexible forwarding engine 604F.

In the example illustrated in FIG. 6, and as described herein, forwarding pipeline 440 may have a configurable pipeline depth, and may process a PRV every cycle. As illustrated, forwarding pipeline 440 pipeline has number of engines to perform different functions. In some examples, some or all of the flexible engines (e.g., flexible forwarding engines 604) may include flexible search key construction, table lookup and an action processor. In such an example, the flexible engine has a set of parameters. Each instance of flexible forwarding engines 604 may be customized based on the expected usage of the engine. One engine has capability to perform two lookups in large size tables (e.g., Hash Table or Direct Index or TCAM) and two lookups in small size tables (e.g., TCAM or Direct Index). In some examples, different "forwarding pipeline profiles" may be used based on enabled features. Such a forwarding profile will program key engines and action processor microcode memory. In some examples, loading of such profiles may be static. Further, to reduce latency of forwarding pipelines, bypass of flexible engines may be selectively enabled. In some implementations, bypass settings may be static and software might not need to be modified when packets are flowing through forwarding pipeline.

Fixed function engines may include engines of various types. For instance, stream selection block 602 selects a stream and pushes PRV in the forwarding pipe. Next hop block 606 may support a limited number of nexthops. Other types of blocks, such as a sample and forwarding result vector generation block (see, e.g., forwarding vector generator 608 of FIG. 8) may perform sampling and/or mirroring of a packet. A rewrite block (see rewrite block 614 of FIG. 8) may include rewrite instruction memory and be capable of generating rewrite instructions for a forwarding result vector. A forwarding statistics and meter block (see, e.g., forwarding meter and statistics block 610 of FIG. 8) may perform tasks relating to counting packets, and metering. In one example, such a block may include up to 2K statistics counters and 512 meters.

Figure 7A:
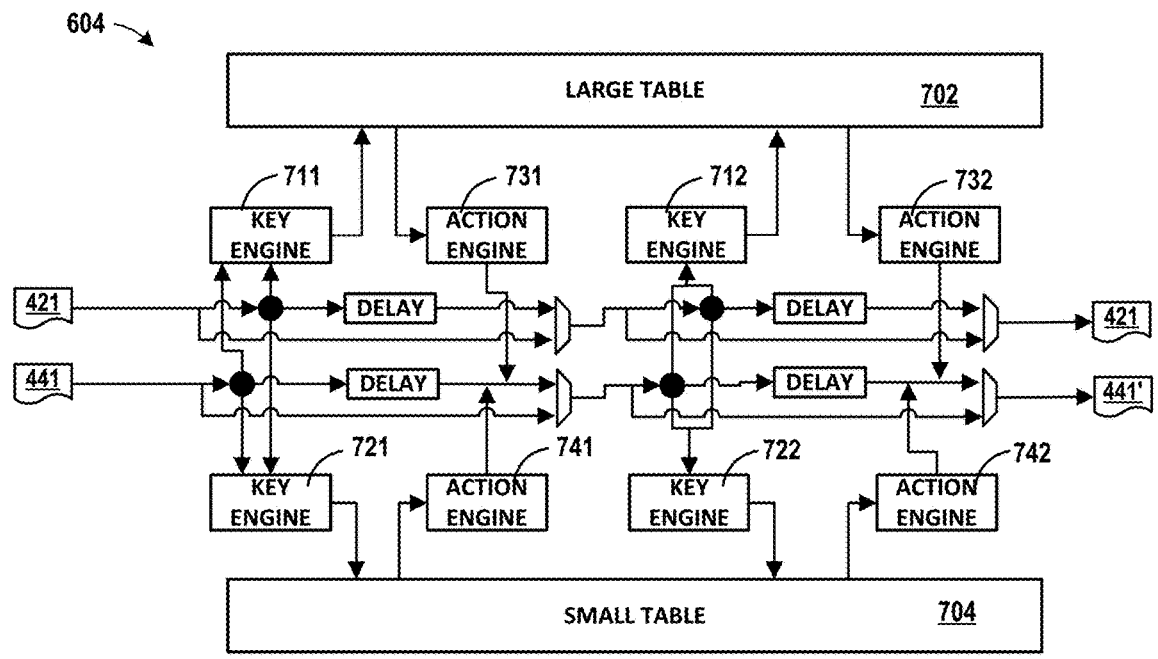
FIG. 7A illustrates an example flexible forwarding engine, in accordance with one or more aspects of the present disclosure.

FIG. 7A illustrates an example flexible forwarding engine, in accordance with one or more aspects of the present disclosure. In the example of FIG. 7A, flexible forwarding engine 604 (e.g., one of flexible forwarding engine 604A through 604F) includes large table 702 and small table 704, enabling packet processing functions that use both small tables and large tables. In some examples, a small table may have on the order of 100 entries (e.g., addresses or other information), and a large table may have on the order of thousands of entries. In other examples, different sizes may be appropriate. Flexible forwarding engine 604 of FIG. 7A further includes a number of key engines (711, 721, 712, and 722) and a number of action engines (731, 741, 732, 742).

Flexible forwarding engine 604 may perform operations to modify metadata 441. For instance, in the example of FIG. 7A, flexible forwarding engine 604 receives parsed result vector 421 and metadata 441 as input. Key engine 711 performs a lookup on large table 702 based on parsed result vector 421. Action engine 731 performs an action on metadata 441 based on the results of the lookup performed by key engine 711. In some examples, the action performed by action engine 731 may involve setting flags that may describe or specify how to modify and/or forward a packet. In one such example, action engine 731 may, based on a lookup performed by key engine 711, write a destination address to metadata 441.

Further, key engine 721 performs a lookup on small table 704, also based on parsed result vector 421, and action engine 741 performs an action on metadata 441 based on the results of the lookup performed by key engine 721. In some examples, key engine 721 performs the lookup on small table 704 and action engine 741 performs the action on metadata 441 concurrently and/or simultaneously with the lookup and action performed by key engine 711 and action engine 731.

In the example of FIG. 7A, flexible forwarding engine 604 has a second stage of key engines and action engines. In a manner similar to the first stage, key engine 712 may perform a lookup on large table 702 based on parsed result vector 421, and action engine 732 may perform an action on metadata 441 based on the results of the lookup. Also, key engine 722 may perform a lookup on small table 704 based on parsed result vector 421, and action engine 742 may perform an action on metadata 441 based on the results of the lookup. In some examples, second-stage lookups and actions performed by key engine 712, action engine 732, key engine 722, and action engine 742 may be performed after those performed by the first stage lookups and actions (performed by key engine 711, action engine 731, key engine 721, 741). In other examples, some first and second stage lookups may be performed concurrently and/or simultaneously. In such an example, a wide or double-wide search key may be constructed and used by key engine 711 and key engine 712 to perform a double-wide lookup large table 702. To perform such a lookup, looks performed by key engine 721 and/or key engine 722 may be disabled.

After performing various lookups and/or actions, flexible forwarding engine 604 outputs metadata 441' (a modified version of metadata 441) to the next block in the pipeline. Flexible forwarding engine 604 may also output, to the next block parsed result vector 421 without modification. In some examples, the next block may be another one of flexible forwarding engines 604 within forwarding pipeline 440, or in other examples, the next block may be a fixed function block (e.g., next hop block 606).

In the example illustrated in FIG. 7A, and as described herein, flexible forwarding engine 604 may support lookups (L-1 and L-2) in two large size tables and two small size (S-1 and S-2) tables. L-1 and S-1 lookups may be done in parallel. L-2 and S-2 lookups may be performed in parallel.

In the example of FIG. 7A, each of flexible forwarding engines 604 may include four independent key generators to prepare the lookup key, four lookup engines and four action processors. Size of lookup key is parameter of the FFE instance. Each key generator in an instance of the engine can generate the lookup key of same size. In some examples, flexible forwarding engine 604 may be configured to create a "Double Wide" search key (DKEY). In such an example, software can couple two key engines ('L-1 and S-1' or 'L-2 and S-2') to create double wide key. A create double wide key can be created by coupling key engine of L-1 stage and key engine of L-2 stage.

Figure 7B:
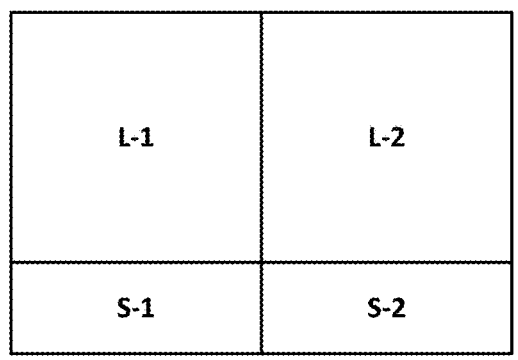
FIG. 7B is a conceptual diagram of an example memory structure of an example flexible forwarding engine, in accordance with one or more aspects of the present disclosure.

FIG. 7B is a conceptual diagram of an example memory structure of an example flexible forwarding engine, in accordance with one or more aspects of the present disclosure. In some examples, large table 702 and small table 704 of FIG. 7A may each be partitioned into two tables (L-1 and L-2), as illustrated in FIG. 7B. In such an example, tables L-1 and S-1 are assigned to the first stage of key engines and action engines (711, 721, 731, 741), and tables L-2 and S-2 are assigned to the second stage of key engines and action engines (712, 722, 732, 742). Flexible forwarding engine 604 may perform parallel lookups in each stage in both the large tables (L-1 and L-2) and the small tables (S-1 and S-2). In other words, L-1 and S-1 lookups may be done in parallel, and L-2 and S-2 lookups may be done in parallel. In some examples, flexible forwarding engine 604 may enable a lookup with a double wide search key, coupling two key engines (e.g., key engine 711 and key engine 721 or key engine 712 and key engine 722) for one search.

In the example of FIG. 7B, and as described herein, one or more of flexible forwarding engines 604 may partition the physical space of a large table among two large lookup stages (L-1 and L-2), resulting in multiple (4) banks; software can assign banks to first lookup or second lookup stage. Further, flexible forwarding engine 604 may enable sharing of small tables (S-1 and S-2) among two stages. Both the large and the small tables may be implemented as hash tables, TCAM tables, or direct index tables.

Each flexible forwarding engine 604 may be implemented with four action engines, as illustrated in FIG. 7A. In some examples, each action engine can be viewed as VLIW (Very Large Instruction Word) processor, supporting execution of six 4NI instructions and four flag instructions. Each instance of flexible forwarding engine 604 within forwarding pipeline 440 may be built using different parameters, including lookup key size, large table size (e.g., number of entries), and small table size (e.g., number of entries).

FIG. 7C is an illustration of the type of data that may be included in metadata generated by an example forwarding pipeline, in accordance with one or more aspects of the present disclosure. As illustrated in FIG. 7C, metadata 441 may include a number of flags, and may also include a field vector. In the example shown, the metadata field vector may be nibble-addressable, which may, in some implementations, result in a more efficient structure for metadata 441.

Figure 8:
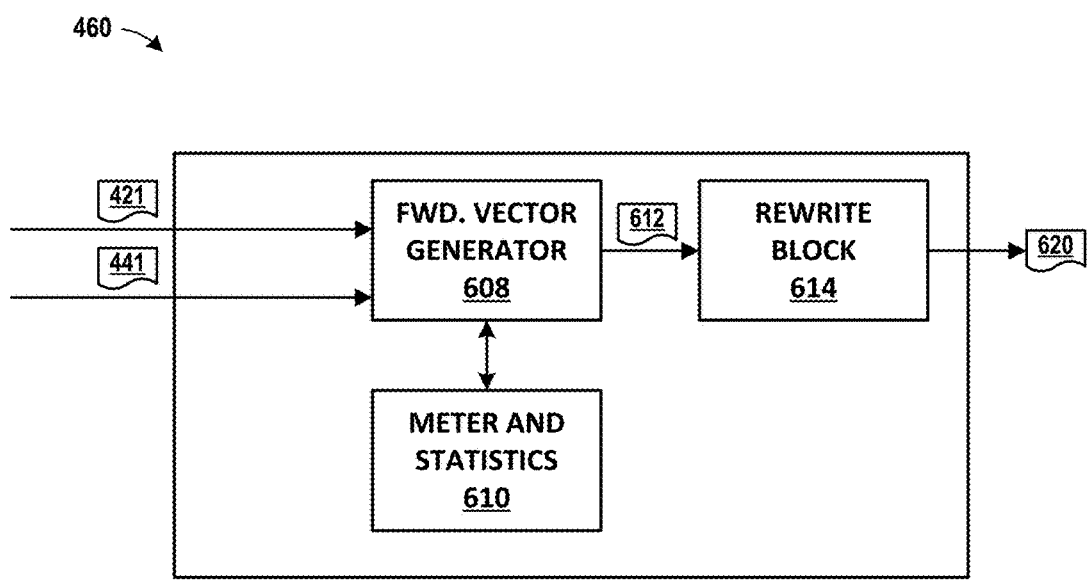
FIG. 8 illustrates an example rewrite block, in accordance with one or more aspects of the present disclosure.

FIG. 8 illustrates an example rewrite block, in accordance with one or more aspects of the present disclosure. In the example of FIG. 8, rewrite block 460 includes forwarding vector generator 608, forwarding meter and statistics block 610, and rewrite block 614. Rewrite block 460 accepts parsed result vector 421 and metadata 441 as input. Forwarding vector generator 608 processes the input and generates forwarding vector 612. In addition, forwarding meter and statistics block 610 may perform various counting and metering operations. The results of the counting and/or metering operations may be reflected in forwarding vector 612. Forwarding vector 612 may include forwarding control information for consumption by other blocks within networking unit 142 or elsewhere. Forwarding vector 612 may also include an address to rewrite instructions for execution by rewrite block 614. In some examples, forwarding vector 612 may be stored in packet buffer 174 and/or output to source agent block 180 or destination agent block 182 of FIG. 3.

Rewrite block 614 executes, based on forwarding vector 612, rewrite instructions to modify packet header 410. While executing the instructions, rewrite block 614 may sample and/or access packet header 410 and/or parsed result vector 421. Rewrite block 614 outputs modified packet 620 to another block, such as packet switch 480 as illustrated in FIG. 4.

In some examples, rewrite block 460 may generate two buses: "fwd_psw_ctl" and "fwd_psw_frv." The "fwd_psw_ctl" bus carries control information for PSW (packet switch). In some examples, this information is not stored with the packet. The "fwd_psw_frv" bus may be 64 Bytes wide and may be stored with the packet in PSW packet memory. If the PSW stream is the FAE (forwarding acceleration engine) stream, then rewrite block 460 might not generate "fwd_psw_ctl" and "fwd_psw_frv," and instead, it might send "fae_frv" to an FAE block.

In some examples, forwarding vector generator 608 may performs two main functions: (1) Rewrite Instructions Generation and (2) Packet Sample Decision. With respect to rewrite instruction generation, forwarding vector generator 608 may include "rewrite instruction memory" of, for example, 4096 entries, with each entry storing six rewrite instructions. The rewrite instruction memory may be configured by software to pair two consecutive single entries and create a double entry. This allows software to execute up to 12 rewrite instructions per packet. In some examples, software may be responsible for guaranteeing that each set of rewrite instructions will fit in 32 Byte FRV rewrite instruction space. The address of the rewrite instruction memory may be generated in next hop block 606 of FIG. 6 by programming a "memory base address" and a "rewrite profile" with the final nexthop. The rewrite profile is a four bit number; hardware can support sixteen set of profiles for offset generation. The "rewrite profile", "metadata flags [0:3]", and template 531 are used to configure a key to perform a lookup in a TCAM to generate the offset. Next hop block 606 adds an "instruction memory base address" and "instruction memory offset" to generate the rewrite instruction memory address.

With respect to Packet Sample Decision functions, forwarding vector generator 608 may support a number of samplers (e.g., sixty-four, in one example). Each sampler can decide to make a "sample copy" of the packet. Each sampler has a set of parameters to determine the packet to be sampled. Software can use one of the samplers to perform "ingress port mirroring" or "egress port mirroring."

In some examples, rewrite block 460 may modify underlay headers for different types of packets. Modifications to an outgoing packet may depend on many parameters. For example, such parameters may include the following: (1) Stack of packet headers (e.g., whether the incoming packet carries a C2T (CPU 2 Header) or whether the packet is an IPv4 or IPv6 packet), (2) Forwarding Type (whether the packet is being forwarded to the egress stream as Ethernet switch or whether the packet is being routed), (3) Egress Stream Type (if the packet is forwarded to the ERP stream, the modified packet should carry a T2N (TOR 2 NIC) or T2C (TOR 2 CPU) header, in addition to the other packet modifications), (4) Add or Remove LFA (loop-free alternate) tag (for some intra-cluster links within an access node 130 of FIG. 2, it may be advantageous to carry an LFA tag to carry a sixteen bit wide specifying visited access nodes, for implementations involving sixteen access nodes 130 arranged in a cluster). In general, the architecture of networking unit 142 can be flexible enough to support new protocols or customizing forwarding pipeline features for an end-user. Networking unit 142 may also support flexibility for the egress packet modifications.

Figure 9:
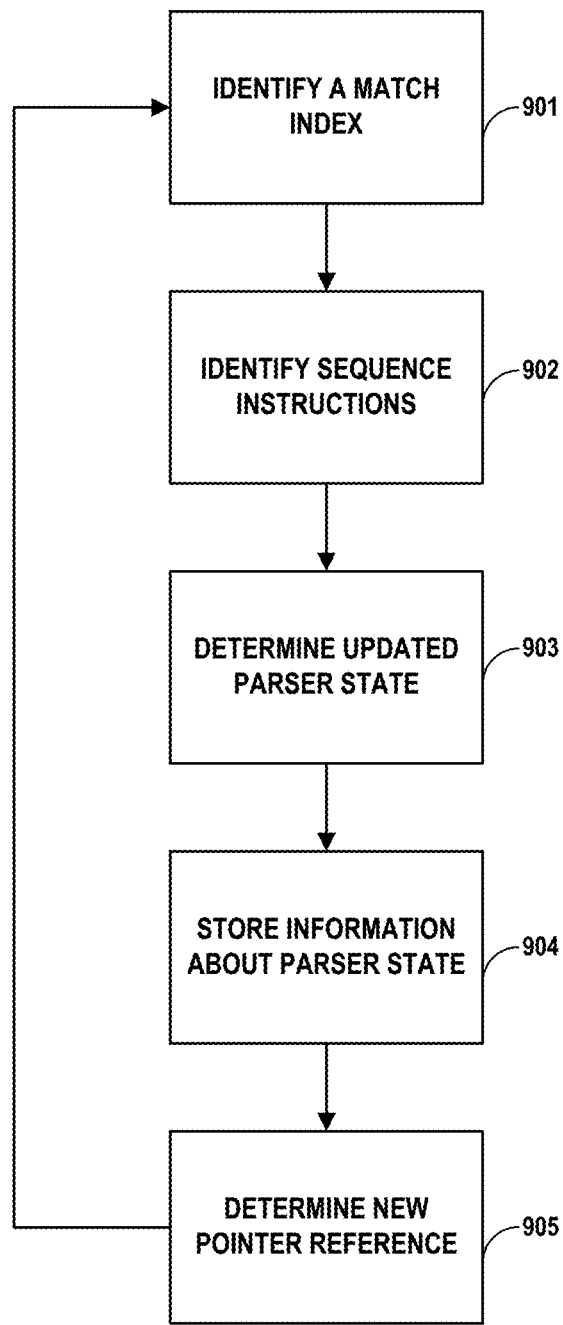
FIG. 9 is a flow diagram illustrating an example process for parsing network data, in accordance with one or more aspects of the present disclosure.

FIG. 9 is a flow diagram illustrating an example process for parsing network data, in accordance with one or more aspects of the present disclosure. In the example of FIG. 9, the illustrated process may be performed by parser 420 in the context illustrated in FIG. 5A. In other examples, different operations may be performed, or operations described in connection with FIG. 9 may be performed by one or more other components, modules, systems, and/or devices. Further, in other examples, operations described in connection with FIG. 9 may be merged, performed in a difference sequence, or omitted.

In the example of FIG. 9, and in accordance with one or more aspects of the present disclosure, parser 420 may identify a match index (901). For instance, in some examples, content-addressable memory 508 accepts four bytes from packet byte vector 504 (via multiplexer 506) and data from parser state storage 524. Content-addressable memory 508 performs a search, based on the input, for a match index. Content-addressable memory 508 determines a match index and outputs the match index to sequence memory 512. In some examples, rather than accepting bytes from packet byte vector 504 as input, content-addressable memory 508 may, depending on the parser state stored in parser state storage 524, accept data from one or more general purpose registers 526 as input.

Parser 420 may identify sequence instructions (902). For instance, in some examples, sequence memory 512 uses the match index received from content-addressable memory 508 to address memory within sequence memory 512. Based on the match index, sequence memory 512 identifies a series of instructions, stored within sequence memory 512, that can be executed by sequence machine 513.

Parser 420 may determine an updated parser state (903). For instance, in some examples, sequence machine 513 executes at least some of the identified instructions to determine a new parser state (903). Sequence machine 513 causes the new parser state to be stored in parser state storage 524 (904).

Parser 420 may also determine a new pointer reference (904). For instance, in some examples, sequence machine 513 executes additional identified instructions to determine how many bytes within packet byte vector 504 to advance packet pointer 505. Sequence machine 513 may, for example, determine that one or more bytes within packet byte vector 504 need not be processes and may be skipped. In such an example, sequence machine 513 may cause packet pointer 505 to advance beyond the four bytes used as input to content-addressable memory 508, as described above. After advancing packet pointer 505, parser 420 may resume the process at 901 to process additional bytes from packet byte vector 504.

Figure 10:
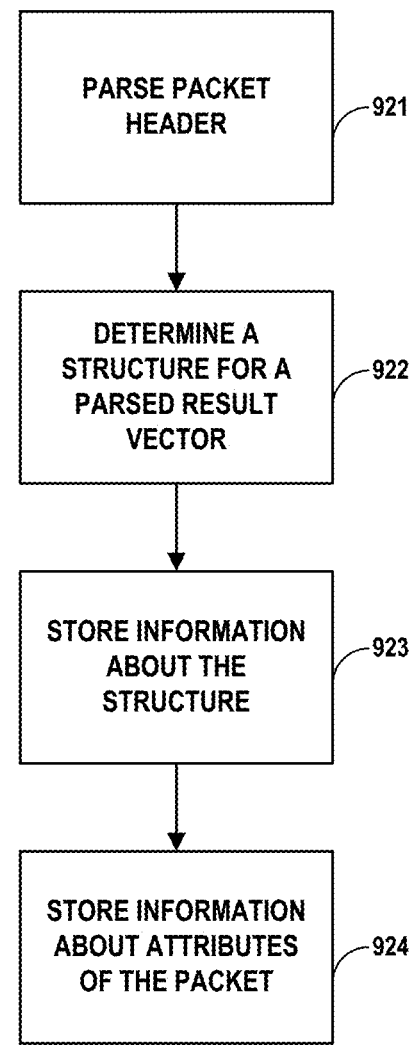
FIG. 10 is a flow diagram illustrating an example process for generating a parsed result vector, in accordance with one or more aspects of the present disclosure.

FIG. 10 is a flow diagram illustrating an example process for generating a parsed result vector, in accordance with one or more aspects of the present disclosure. In the example of FIG. 10, the illustrated process may be performed by parser 420 in the context illustrated in FIG. 5A. In other examples, different operations may be performed, or operations described in connection with FIG. 10 may be performed by one or more other components, modules, systems, and/or devices. Further, in other examples, operations described in connection with FIG. 10 may be merged, performed in a difference sequence, or omitted.

In the example of FIG. 10, and in accordance with one or more aspects of the present disclosure, parser 520 may parse a packet header (921). For instance, in some examples, header memory 502 pushes data from header memory 502 into packet byte vector 504. Packet byte vector 504 processes data from header memory 502 sequentially by using packet byte vector 504 as part of a lookup key to content-addressable memory 508. Content-addressable memory 508 identifies a match index to sequence memory 512. Sequence machine 513 executes instructions, stored within sequence memory 512 and identified based on the match index, to sequentially parse bytes within packet byte vector 504. Content-addressable memory 508 may also identify a match index to action memory 510. In some examples, the match index to action memory 510 may be the same as the match index to sequence memory 512. Action processor 511 executes instructions, stored within action memory 510 and identified based on the match index, to perform actions based on data within packet byte vector 504.

Action processor 511 may determine a structure for parsed result vector 421 (922). For instance, in some examples, action processor 511 may execute instructions that identify, based on packet byte vector 504, one or more network layer protocols (e.g., Ethernet, IPv4, IPv6) that are associated with the packet header within packet byte vector 504. Action processor 511 may also execute instructions that identify, based on packet byte vector 504, other attributes of the packet and/or the network (e.g., whether a VLAN header has been detected). Action processor 511 may identify, based on the information identified about the packet and/or the network, a structure for parsed result vector 421 that is appropriate for the packet and/or network. In some examples, one structure may be appropriate for some types of networks (e.g., those based on IPv4), and another type of structure may be appropriate for other types of networks (e.g., those based on IPv6). In other examples, one structure may be applied to multiple different types of networks (e.g., IPv4 and IPv6), and flags or settings within parsed result vector 421 may specify the type of applicable network.

Action processor 511 may store information about attributes of the packet. For instance, in some examples, action processor 511 may store, within parsed result vector 421, information about network layer protocols associated with the packet. Action processor 511 may also store, within parsed result vector 421, information about other attributes of the packet and/or the network. Action processor 511 may store such information at appropriate locations within parsed result vector 421 as defined by the structure of parsed result vector 421. For example, action processor 511 may store flags in flag fields 532 within parsed result vector 421. Action processor 511 may also store other information (e.g., an SMAC or DMAC Ethernet address) in appropriate areas, as defined by template 531, of field vector 533 within parsed result vector 421.

Figure 11:
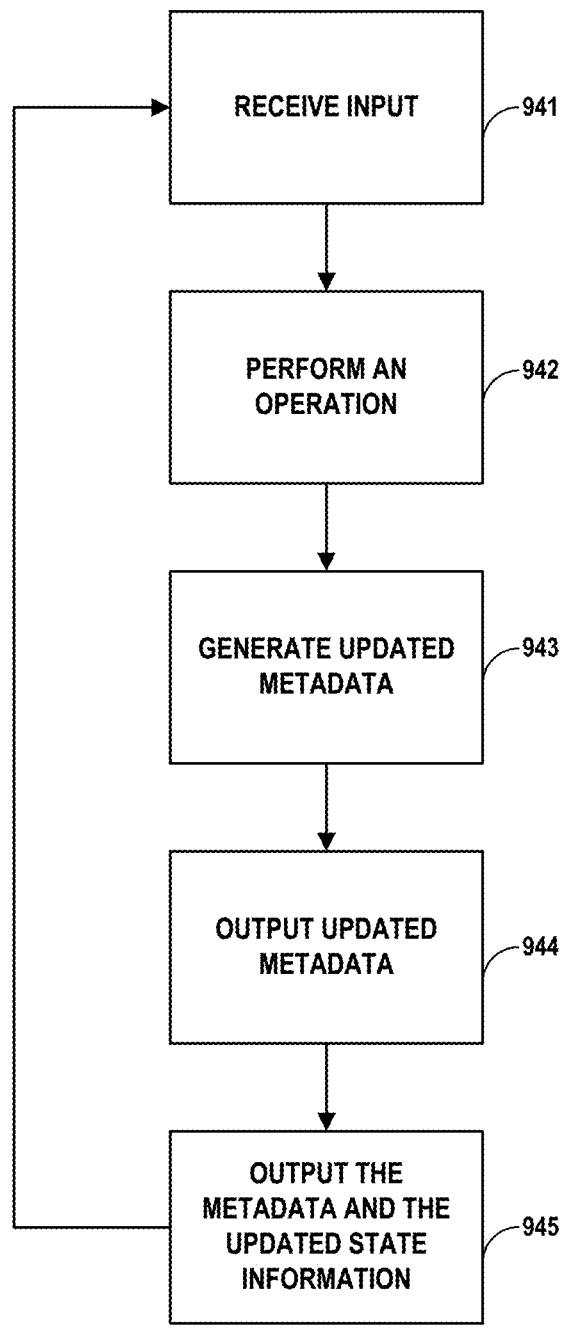
FIG. 11 is a flow diagram illustrating an example process for generating metadata based on a parsed result vector, in accordance with one or more aspects of the present disclosure.

FIG. 11 is a flow diagram illustrating an example process for generating metadata based on a parsed result vector, in accordance with one or more aspects of the present disclosure. In the example of FIG. 11, the illustrated process may be performed by flexible forwarding engine 604 in the context illustrated in FIG. 7A. In other examples, different operations may be performed, or operations described in connection with FIG. 11 may be performed by one or more other components, modules, systems, and/or devices. Further, in other examples, operations described in connection with FIG. 11 may be merged, performed in a difference sequence, or omitted.

In the example of FIG. 10, and in accordance with one or more aspects of the present disclosure, flexible forwarding engine 604 may receive input (941). For instance, in some examples, flexible forwarding engine 604 receives both parsed result vector 421 and metadata 441 from a prior flexible forwarding engine (or other block) within forwarding pipeline 440. Both parsed result vector 421 and metadata 441 serve as inputs to key engine 711 and key engine 721. Further, both parsed result vector 421 and metadata 441 serve as inputs to key engine 712 and key engine 722. In some examples, parsed result vector 421 and metadata 441 may be fed through a delay block prior to serving as an input to key engine 712 and key engine 722.

Flexible forwarding engine 604 may perform an operation (942). For instance, in some examples, key engine 711 uses both parsed result vector 421 and metadata 441 to perform a lookup in large table 702. Large table 702 identifies one or more match indexes, or one or more addresses within large table 702. Action engine 731 performs operations specified by the match index or the one or more addresses. In some examples, action engine 731 may perform process an access control list, perform an address lookup, perform counting operations, and/or perform rate limiting functions. Many other operations may alternatively be performed. Further, key engine 712 may also use both parsed result vector 421 and metadata 441 to perform a lookup in small table 704. Small table 704 may identify one or more match indexes within small table 704. Action engine 741 may perform operations specified by the match index.

Flexible forwarding engine 604 may generate updated metadata (943). For instance, in some examples, action engine 731 generates data as a result of performing the one or more operations specified by the match index identified by large table 702. Action engine 731 may write the data to a bus on which metadata 441 is stored, as shown in FIG. 7A, thereby updating metadata 441. Similarly, action engine 741 generates data as a result of performing the one or more operations specified by the match index identified by small table 704. Action engine 741 may write the data to the bus on which metadata 441 is stored, thereby further updating metadata 441.

In some examples, action engine 732 and action engine 742 may also update metadata 441. For instance, action engine 732 and action engine 742 may each generate data as a result of performing an operation specified by a match index identified by large table 702 and small table 704, respectively. In such an example, action engine 732 and action engine 742 may each perform a second-stage lookup within large table 702 and small table 704. Each of action engine 732 and action engine 742 may write the generated data to the bus on which metadata 441 is stored, and further update metadata 441 through a second-stage operation.

Flexible forwarding engine 604 may output the updated metadata (944). For instance, in some examples, flexible forwarding engine 604 may output parsed result vector 421 and metadata 441 to a later flexible forwarding engine (or other block) within forwarding pipeline 440. In the example described, parsed result vector 421 is not modified by flexible forwarding engine 604. Metadata 441, however, has been modified flexible forwarding engine 604 as a result of the operations performed by action engine 731, action engine 741, action engine 732, and/or action engine 742. Accordingly, flexible forwarding engine 604 may output metadata 441 as updated metadata 441'.

Figure 12:
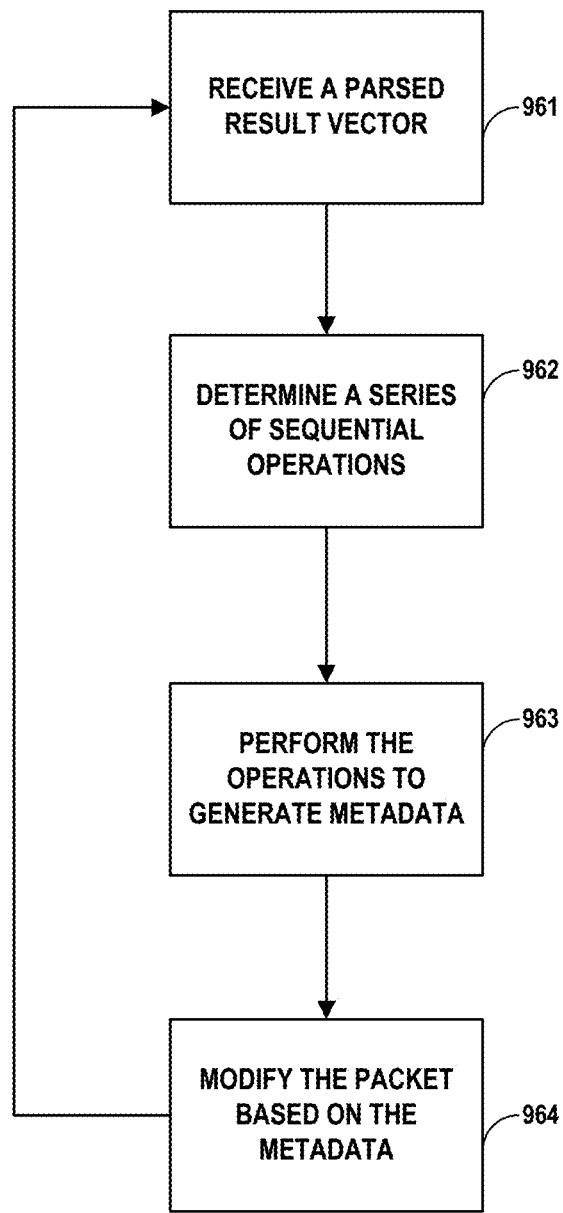
FIG. 12 is a flow diagram illustrating an example process for generating metadata through a sequence of operations performed based on a parsed result vector, in accordance with one or more aspects of the present disclosure.

FIG. 12 is a flow diagram illustrating an example process for generating metadata through a sequence of operations performed based on a parsed result vector, in accordance with one or more aspects of the present disclosure. In the example of FIG. 12, the illustrated process may be performed by a series of blocks, including a series of flexible forwarding engines 604, in the context illustrated in FIG. 4, FIG. 6, and FIG. 8. In other examples, different operations may be performed, or operations described in connection with FIG. 12 may be performed by one or more other components, modules, systems, and/or devices. Further, in other examples, operations described in connection with FIG. 12 may be merged, performed in a difference sequence, or omitted.

In the example of FIG. 10, and in accordance with one or more aspects of the present disclosure, forwarding pipeline 440 may receive, as input, a parsed result vector (961). For instance, in some examples, stream selection block 602 receives a plurality of parsed result vectors 421. Stream selection block 602 selects from among the parsed result vectors 421, a stream and a corresponding parsed result vector 421. Stream selection block 602 outputs to one of a plurality of flexible forwarding engines 604 (e.g., flexible forwarding engine 604A), the selected parsed result vector 421. In some examples, stream selection block 602 may also output metadata 441 to the flexible forwarding engine 604A.

Forwarding pipeline 440 may determine a series of sequential operations (962). For instance, in some examples, a plurality of flexible forwarding engines 604 may each be configured to perform one or more operations, and each of flexible forwarding engines 604 accepts, as input, the parsed result vector 421 selected by stream selection block 602. Each of flexible forwarding engines 604 may determine which operation to perform based on parsed result vector 421. For example, based on the template included within parsed result vector 421, each of flexible forwarding engines 604 may be programmed to perform a specific operation. Each of flexible forwarding engines 604 determines its operation based on a state information included within metadata 441. In the example of FIG. 6, flexible forwarding engine 604A determines, based on the state information included within metadata 441, that it is the first of a plurality of flexible forwarding engines 604. Flexible forwarding engine 604A also determines that based on the template included within parsed result vector 421, the first of the plurality of flexible forwarding engines 604 is to perform a counting function. Similarly, flexible forwarding engine 604B may determine that it is the second of the plurality of flexible forwarding engines 604 and based on the template included within parsed result vector 421, the second of flexible forwarding engines 604 is to perform a different function, such as an address lookup involving an address stored within parsed result vector 421. One or more of the remaining flexible forwarding engines 604 each determine, in a similar manner based on state information included within metadata 441, the operation it will perform.

In some examples, one or more of flexible forwarding engines 604 might not perform any operation, and in such an example, might configured as simply a pass-through block for parsed result vector 421 and metadata 441. Further, in some examples, one or more function blocks included within forwarding pipeline 440 may serve as fixed function blocks that perform the same function without regard to parsed result vector 421 and/or metadata 441. For instance, in the example of FIG. 6, stream selection block 602 of forwarding pipeline 440 performs a stream selection operation, and next hop block 606 determines a next hop address.

Forwarding pipeline 440 may perform the operations to generate metadata (963). For instance, in some examples, each of flexible forwarding engines 604 within forwarding pipeline 440 performs an operation. As the result of each operation performed by each of flexible forwarding engines 604, each flexible forwarding engine 604 updates metadata 441 by, for example, writing data to a metadata bus received as input from a previous flexible forwarding engine 604. After updating the input metadata, each flexible forwarding engine outputs its updated metadata 441 to the next flexible forwarding engine 604 in forwarding pipeline 440.

Forwarding pipeline 440 may modify the packet based on the metadata (964). For instance, in some examples, after processing by each of the blocks (e.g., stream selection block 602, flexible forwarding engines 604, and next hop block 606) of forwarding pipeline 440 is complete, final metadata 441' is passed to forwarding vector generator 608 (see FIG. 8). Forwarding vector generator 608 generates, based on metadata 441', forwarding vector 612 (see FIG. 8). Rewrite block 614 reads from rewrite instruction memory, included within rewrite block 614, and generates rewrite instructions. Rewrite block 614 executes the rewrite instruction, which may modify the packet and/or packet header. In some examples, rewrite block 614 may output the packet and/or forwarding vector 612 to packet switching hardware.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   identifying, by a device and based on a parser state of the device and further based on a subset of data of a packet header for a packet, a match index, wherein the subset of data is referenced by a pointer, and wherein the device includes separate sequence memory and action memory;
   identifying, by the device and based on the match index, one or more sequence instructions stored in the sequence memory included within the device, wherein the sequence memory has a faster access time than the action memory included within the device;
   executing, by the device, the sequence instructions to determine an updated parser state and an updated pointer, wherein parsing speed of the device is dependent upon how quickly the updated parser state is determined, and wherein the updated pointer references a new subset of data of the packet header;
   identifying, by the device, one or more action instructions stored in the action memory included within the device; and
   executing, by the device, the action instructions, wherein executing the action instructions includes storing at least one attribute of the packet header.

2. The method of claim 1, wherein executing the action instructions includes:
determining, by the device, a structure for a parsed result vector for the packet header.

3. The method of claim 2, wherein storing at least one attribute of the packet header includes:
storing, within the parsed result vector, the at least one attribute of the packet header.

4. The method of claim 3, further comprising:
performing, by the device and based on the parsed result vector, a lookup in a first table to identify a first result;
performing, by the device and based on the parsed result vector, a lookup in a second table to identify a second result, wherein the second table is larger than the first table;
generating, by the device and based on the first result and the second result, metadata that includes information about how to forward the packet on the network; and
outputting, by the device, the metadata.

5. The method of claim 3, further comprising:
determining, by the device and based on the parsed result vector, a plurality of sequential operations to perform;
performing, by the device, the plurality of sequential operations to generate metadata that includes information about how to forward the network packet on the network.

6. The method of claim 5, further comprising:
modifying, by the device and based on the metadata, the network packet.

7. The method of claim 5, further comprising:
forwarding, by the device and based on the metadata, the network packet.

8. The method of claim 1, further comprising:
identifying, by the device and based on the new subset of data and the updated parser state, a new match index.

9. The method of claim 1, further comprising:
identifying, by the device and based on stored information from the packet header and the updated parser state, a new match index.

10. The method of claim 1, further comprising:
storing, by the device in one or more registers included within the device, information about the updated parser state.

11. The method of claim 1,
wherein the action instructions are executed by an action processor, and
wherein the sequence instructions are executed by a sequence machine, and wherein the sequence machine stores at least some of the subset of data to one or more registers included within the device.

12. The method of claim 1, wherein identifying the one or more action instructions includes:
identifying, based on the match index, the action instructions.

13. The method of claim 1, wherein the match index is a sequence match index, and wherein identifying the action instructions includes:
identifying, based on subset of data and the parser state, an action match index; and
identifying, based on the action match index, the action instructions.

14. The method of claim 1,
wherein identifying the match index includes identifying, by the device using a ternary content addressable memory, the match index.

15. The method of claim 1,
wherein executing the action instructions includes storing, in a parsed result vector, information identifying a template.

16. The method of claim 1,
wherein executing the action instructions includes setting, in a parsed result vector, a plurality of flags.

17. The method of claim 1, further comprising:
storing, in the one or more registers, information from the packet header.

18. A device comprising:
content addressable memory configured to identify, based on a subset of data within a plurality of packet headers referenced by at least one pointer, and further based on a parser state, a match index;
sequence memory addressable by the match index;
action memory, wherein the sequence memory has a faster access time than the action memory, and wherein the action memory is separate from the sequence memory;
sequence processing circuitry having access to the sequence memory and configured to:
identify, based on the match index, sequence instructions stored in the sequence memory;
execute the sequence instructions to determine an updated parser state and an updated pointer, wherein parsing speed of the device is dependent upon how quickly the updated parser state is determined, and wherein the updated pointer references a different subset of data within at least one of the plurality of packet headers;
store, in one or more registers included within the device, information about the updated parser state;
action processing circuitry having access to the action memory and configured to identify action instructions stored in the action memory and execute the action instructions to store at least one attribute the packet header; and
a plurality of parsing devices, each of the parsing devices associated with a respective one of the plurality of packet headers.

19. A non-transitory computer-readable storage medium comprising instructions that, when executed, configure processing circuitry to:
identify, based on a parser state of a device and further based on a subset of data of a packet header for a packet, a match index, wherein the subset of data is referenced by a pointer, and wherein the device includes separate sequence memory and action memory;
identify, based on the match index, one or more sequence instructions stored in the sequence memory included within the device, wherein the sequence memory has a faster access time than the action memory included within the device;
execute the sequence instructions to determine an updated parser state and an updated pointer, wherein parsing speed of the device is dependent upon how quickly the updated parser state is determined, and wherein the updated pointer references a new subset of data of the packet header;
identify one or more action instructions stored in the action memory included within the device; and
execute the action instructions, wherein executing the action instructions includes storing at least one attribute of the packet header.

* * * * *